(12) United States Patent
Ko et al.

(10) Patent No.: US 10,429,118 B2
(45) Date of Patent: Oct. 1, 2019

(54) REFRIGERATOR

(71) Applicant: Samsung Electronics Co., Ltd., Suwon-si (KR)

(72) Inventors: Sung Bok Ko, Hwaseong-si (KR); Dong Nyeol Ryu, Suwon-si (KR); In Sub Lee, Suwon-si (KR); Soo Young Lee, Yongin-si (KR); Jeong-Min Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/955,842

(22) Filed: Dec. 1, 2015

(65) Prior Publication Data
US 2016/0153694 A1 Jun. 2, 2016

(30) Foreign Application Priority Data
Dec. 1, 2014 (KR) .......................... 10-2014-0169782

(51) Int. Cl.
*F25D 23/04* (2006.01)
*F25D 17/06* (2006.01)
*F25D 17/04* (2006.01)

(52) U.S. Cl.
CPC .......... *F25D 17/065* (2013.01); *F25D 17/04* (2013.01); *F25B 2600/112* (2013.01);
(Continued)

(58) Field of Classification Search
CPC .. F25D 17/04; F25D 17/065; F25D 2317/061; F25B 2600/112
See application file for complete search history.

(56) References Cited

U.S. PATENT DOCUMENTS 3,009,338 A * 11/1961 Dobbie ................. F25D 11/022
62/382
3,075,366 A * 1/1963 Jung ..................... F25D 17/065
62/285
(Continued)

FOREIGN PATENT DOCUMENTS

CN 1181493 A 5/1998
CN 1291277 A 4/2001
(Continued)

OTHER PUBLICATIONS

Communication with European Search Report dated Apr. 25, 2016 corresponding to European Patent Application No. EP 151972221.
(Continued)

*Primary Examiner* — Frantz F Jules
*Assistant Examiner* — Lionel Nouketcha
(74) *Attorney, Agent, or Firm* — Staas & Halsey LLP

(57) ABSTRACT

Disclosed herein is a refrigerator. The refrigerator includes a refrigerating compartment that is divided into a refrigerating section formed on an upper side thereof and an alternate temperature section formed on a lower side thereof, a cold air supply unit that includes a cold air flow path formed on a rear side of the refrigerating compartment and a refrigerating compartment circulation fan for allowing cold air of the cold air flow path to flow, and a control unit that controls the refrigerating compartment circulation fan. Here, the control unit cools the refrigerating section by turning on the refrigerating compartment circulation fan, and causes deflection of the cold air of the cold air flow path to cool the alternate temperature section by turning off the refrigerating compartment circulation fan.

15 Claims, 18 Drawing Sheets

(52) U.S. Cl.
CPC . *F25B 2600/2511* (2013.01); *F25D 2317/061* (2013.01); *F25D 2317/0682* (2013.01); *F25D 2317/0684* (2013.01); *Y02B 30/743* (2013.01)

(56) References Cited

U.S. PATENT DOCUMENTS

| | | | | |
|---|---|---|---|---|
| 3,077,749 | A * | 2/1963 | Jung | F25D 17/065 312/236 |
| 3,169,383 | A * | 2/1965 | Morton | F25D 17/062 62/382 |
| 6,327,867 | B1 * | 12/2001 | Hyodo | F25B 5/04 62/187 |
| 6,497,113 | B1 * | 12/2002 | Yamada | F25D 11/022 62/199 |
| 7,137,266 | B2 * | 11/2006 | Kim | F25B 5/04 62/198 |
| 2007/0068180 | A1 * | 3/2007 | Yoon | F25B 5/00 62/200 |
| 2007/0209374 | A1 | 9/2007 | Konopa | |
| 2013/0111933 | A1 * | 5/2013 | Yoon | F25D 11/02 62/89 |

FOREIGN PATENT DOCUMENTS

| | | | |
|---|---|---|---|
| CN | 101484764 | A | 7/2009 |
| JP | 2006078050 | | 3/2006 |
| KR | 1019990056249 | | 7/1999 |
| KR | 20040063392 | A * | 7/2004 |

OTHER PUBLICATIONS

Office Action dated Sep. 29, 2017 corresponding to Chinese Patent Application No. 201510864636.5.

Office Action dated May 31, 2018 corresponding to Chinese Patent Application No. 201510864636.5 (21 pgs).

Chinese Patent Office issued Notice to Grant Invention Patent Right (Notice of Allowance) in Chinese Patent Application No. 201510864636.5 dated Oct. 12, 2018 (Total 3 pages).

European Patent Office issued Office Action (Communication pursuant to Article 94(3) EPC) in European Patent Application No. 15197222.1 dated Dec. 11, 2018 (5 pages).

* cited by examiner

REFRIGERATOR

RELATED APPLICATION(S)

This application claims the benefit of Korean Patent Application No. 10-2014-0169782, filed on Dec. 1, 2014 in the Korean Intellectual Property Office, the disclosure of which is incorporated herein by reference.

BACKGROUND

Embodiments of the present disclosure relate to a refrigerator, and more particularly, to a refrigerator which efficiently supplies cold air.

In general, a refrigerator supplies cold air generated by an evaporator to a storage compartment to maintain and store the freshness of various foods for a long time. The storage compartment of the refrigerator is divided into a refrigerating compartment that is kept at approximately 3° C. to refrigerate and store the food and a freezer compartment that is kept at approximately −20° C. to freeze and store the food.

In the freezer compartment, foods to be kept at a temperature lower than a freezer temperature, for example, meat, fish, ice cream, etc., are stored, and in the refrigerating compartment, foods to be kept at the freezer temperature or higher, for example, vegetables, fruits, drinks, etc., are stored.

The refrigerating compartment repeats a cooling cycle in which a refrigerant is compressed, condensed, expanded, and evaporated using a compressor, a condenser, an expander, and an evaporator. In this instance, both the refrigerating compartment and the freezer compartment may be cooled by one evaporator provided on the freezer compartment side, or they may be independently cooled by evaporators respectively provided in the freezer compartment and the refrigerating compartment.

The evaporator cools ambient air in such a manner that a refrigerant in a liquid state takes evaporation heat away from the ambient air while it is evaporated. As the evaporator, a direct cooling type evaporator in which heat exchange directly proceeds inside the storage compartment or an indirect cooling type evaporator in which heat exchange proceeds in a separate space and the generated cold air is provided to the storage compartment may be provided.

SUMMARY

Therefore, it is an aspect of the present disclosure to provide a refrigerator that may efficiently cool a storage compartment.

Additional aspects of the disclosure will be set forth in part in the description which follows and, in part, will be obvious from the description, or may be learned by practice of the disclosure.

In accordance with one aspect of the present disclosure, a refrigerator includes: a refrigerating compartment that is divided into a refrigerating section formed on an upper side thereof and an alternate temperature section formed on a lower side thereof; a cold air supply unit that includes a cold air flow path formed on a rear side of the refrigerating compartment and a refrigerating compartment circulation fan for allowing cold air of the cold air flow path to flow; and a control unit that controls the refrigerating compartment circulation fan, wherein the control unit cools the refrigerating section by turning on the refrigerating compartment circulation fan, and causes deflection of the cold air of the cold air flow path to cool the alternate temperature section by turning off the refrigerating compartment circulation fan.

Here, when the refrigerating compartment circulation fan is turned off, the cold air of the cold air flow path may be introduced into the alternate temperature section by a convection phenomenon to cool the alternate temperature section.

Also, when the refrigerating compartment circulation fan is turned on, the cold air of the cold air flow path may be discharged to the refrigerating section to sequentially cool the refrigerating section and the alternate temperature section, and then may be introduced into the cold air flow path again.

Also, the cold air supply unit may include a first passage that is provided between the cold air flow path and the refrigerating section, and a second passage that is provided between the cold air flow path and the alternate temperature section.

Also, the refrigerator may further include a cold air generating unit that includes a compressor that compresses a refrigerant, a condenser that condenses the compressed refrigerant, and an evaporator that is provided in the cold air flow path and evaporates the condensed refrigerant to generate the cold air.

Also, the cold air flow path may be divided into a front flow path and a rear flow path by the evaporator.

Also, the compressor may compress the refrigerant at higher pressure when the refrigerating compartment circulation fan is turned off.

In accordance with another aspect of the present disclosure, a refrigerator includes: a freezer compartment; a refrigerating compartment that is divided into a refrigerating section formed on an upper side thereof and an alternate temperature section formed on a lower side thereof, and in which a cold air flow path through which cold air is moved is formed on a rear side thereof; a refrigerating compartment circulation fan that allows cold air of the cold air flow path to flow; a freezer compartment circulation fan that allows cold air of the freezer compartment to flow; a cold air generating unit that generates cold air for cooling the freezer compartment and the refrigerating compartment; and a control unit that controls driving of each of the cold air generating unit, the refrigerating compartment circulation fan, and the freezer compartment circulation fan so that the refrigerating compartment and the freezer compartment maintain a target temperature, wherein the control unit cools the refrigerating section by turning on the refrigerating compartment circulation fan, and causes deflection of the cold air of the cold air flow path to cool the alternate temperature section by turning off the refrigerating compartment circulation fan.

Here, the cold air generating unit may include a compressor that compresses a refrigerant, a condenser that condenses the compressed refrigerant, a first evaporator that is provided in the cold air flow path, and evaporates the condensed refrigerant to generate cold air in the cold air flow path, a second evaporator that is provided in the freezer compartment to generate cold air, and a flow path switching valve that is provided between the first evaporator and the second evaporator to adjust introduction of the condensed refrigerant.

Also, the control unit may adjust the flow path switching valve so that the condensed refrigerant is introduced into the first evaporator, and drive the refrigerating compartment circulation fan to cool the refrigerating section.

Also, the control unit may cause deflection of the cold air of the cold air flow path to cool the alternate temperature section by turning off the refrigerating compartment circulation fan, when the refrigerating section reaches a target temperature.

Also, the control unit may control the flow path switching valve so that the condensed refrigerant is introduced into the second evaporator, when the alternate temperature section reaches a target temperature.

Also, the control unit may cool the freezer compartment by turning on the freezer compartment circulation fan when the condensed refrigerant is introduced into the second evaporator, and close the flow path switching valve by turning off the compressor and the refrigerating compartment circulation fan when the freezer compartment reaches a target temperature.

Also, the control unit may recover the refrigerant remaining in the second evaporator by turning on the freezer compartment circulation fan at the beginning of driving of the compressor.

Also, the refrigerating compartment circulation fan may be driven during a preset time after the introduction of the cold air to the first evaporator is stopped, and thereby prevent occurrence of frost in the first evaporator.

Also, the freezer compartment circulation fan may be driven during a preset time after the introduction of the cold air to the second evaporator is stopped, and thereby prevent occurrence of frost in the second evaporator.

Also, the compressor may be rotated at a higher rotational speed when the alternate temperature section is cooled by deflection of the cold air, and thereby compress the refrigerant at higher pressure.

Also, the refrigerator may further include a cover that is positioned so as to be spaced apart from a rear surface of the refrigerating compartment forward, and covers the cold air flow path, wherein the cover may include a first passage that connects the cold air flow path and the refrigerating section and a second passage that connects the cold air flow path and the alternate temperature section.

Also, the cold air flow path may be divided into a front flow path and a rear flow path by the first evaporator.

By providing the above-described refrigerator, it is possible to increase the cooling efficiency of the storage compartment.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
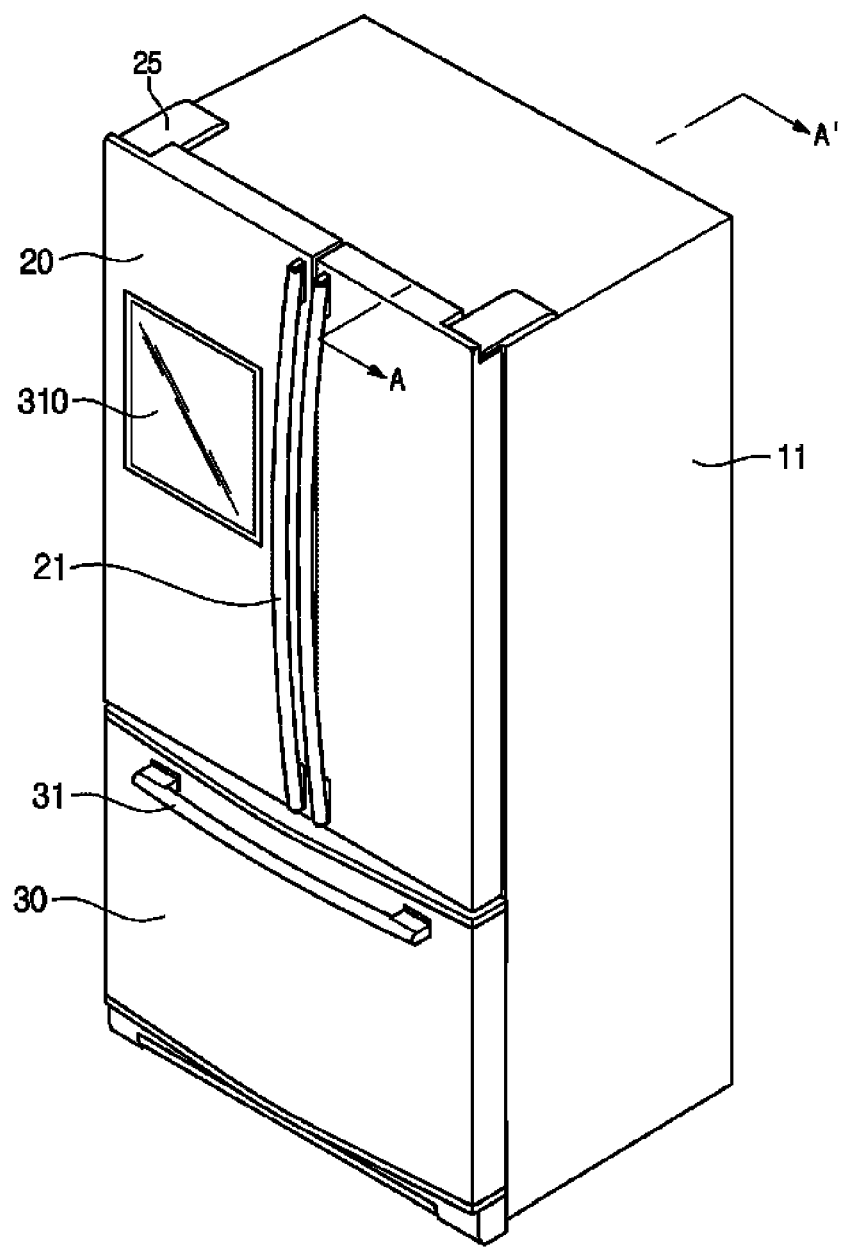
FIG. 1 is a perspective view showing the appearance of a refrigerator in accordance with one embodiment of the present disclosure.

In the following description, embodiments of the present disclosure will be described in detail with reference to the accompanying drawings in such a manner that the disclosure may be easily carried out by a person having ordinary skill in the art to which the disclosure pertains. In the drawings, in order to clearly describe the present disclosure, parts which are not related to the description will be omitted.

Terms including an ordinal number such as "first", "second", and the like may be used to describe a variety of components, but the components shall not be limited to the terms. These terms are only used to distinguish one element from the other.

FIG. 1 is a perspective view showing the appearance of a refrigerator in accordance with one embodiment of the present disclosure.

Figure 2:
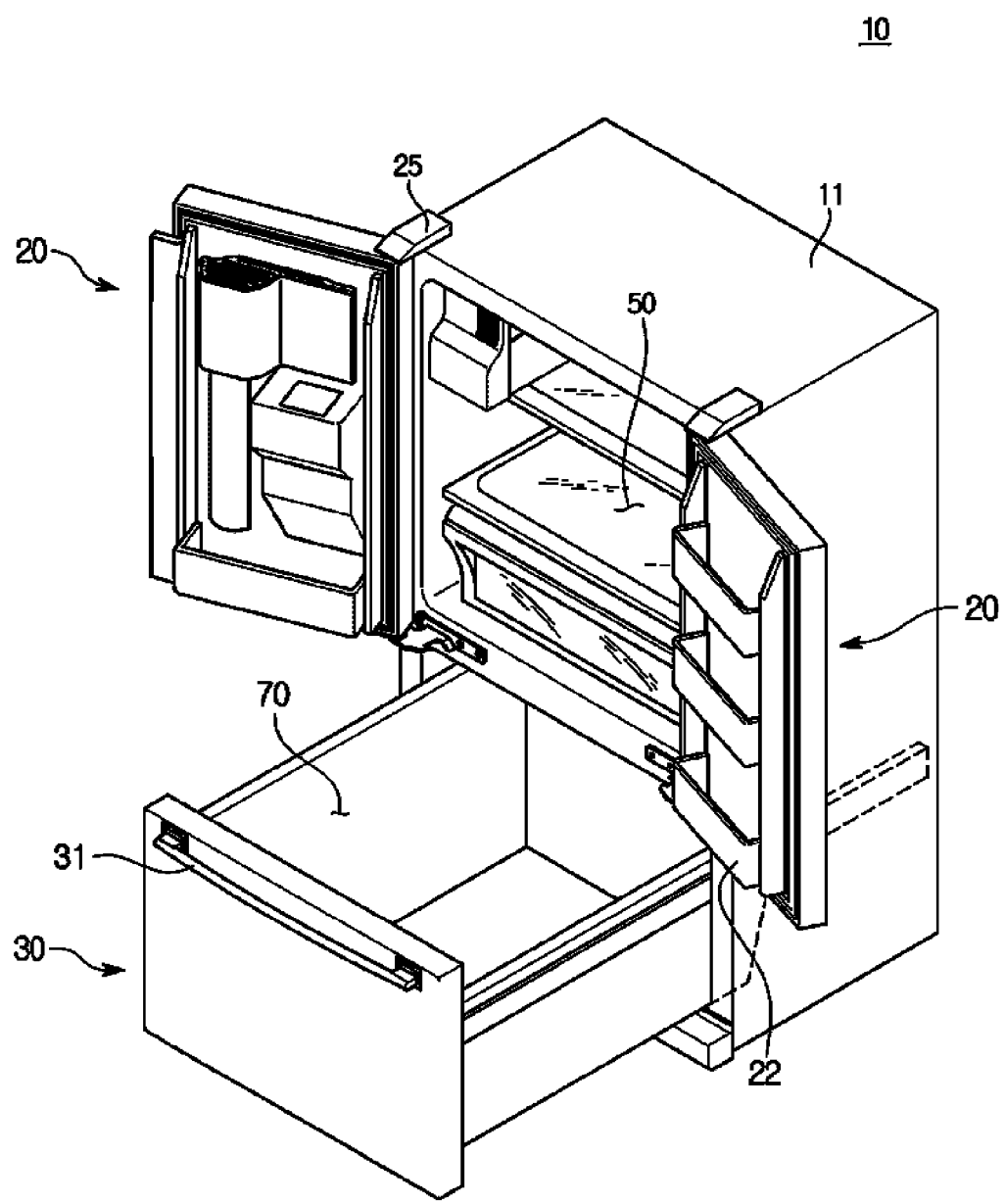
FIG. 2 is a perspective view showing the inside of a refrigerator in accordance with one embodiment of the present disclosure.

FIG. 2 is a perspective view showing the inside of a refrigerator in accordance with one embodiment of the present disclosure.

Figure 3:
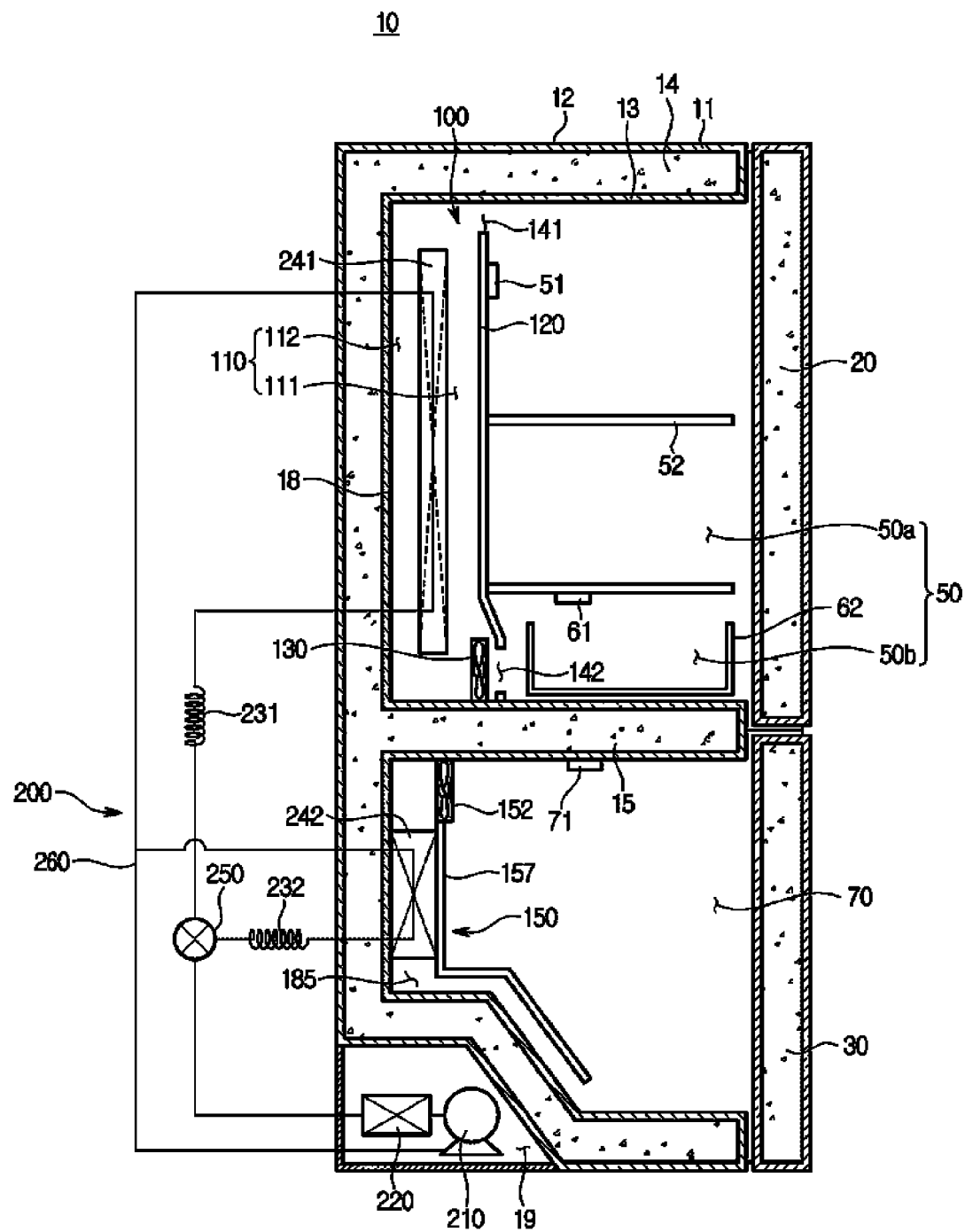
FIG. 3 is a view obtained by cutting the refrigerator of FIG. 1 by an A-A' section.

FIG. 3 is a view obtained by cutting the refrigerator of FIG. 1 by an A-A' section.

Referring to FIGS. 1 to 3, a refrigerator 10 may include a main body 11, refrigerating compartment doors 20 and freezer compartment door 30 connected to the main body 11, and a cold air generating unit 200 that generates cold air.

The main body 11 includes an external box 12 and an internal box 13.

The external box 12 forms the appearance of the main body 11. The external box 12 may be made of a metallic material having durability and aesthetic sense and formed by press molding.

The internal box 13 is provided on an inner side of the external box 12 to form the refrigerating compartment 50 and the freezer compartment 70. The internal box 13 may be formed by injection-molding a resin material, and injection-molded in one piece.

A heat insulating material 14 may be provided between the internal box 13 and the external box 12. The heat insulating material 14 is filled between the internal box 13 and the external box 12 to prevent the leakage of cold air inside the refrigerating compartments 50 and the freezer compartment 70 and prevent the influx of external warm air. As an example of the heat insulating material 14, urethane foam may be used.

The refrigerating compartment 50 and the freezer compartment 70 are provided with opened front surfaces so as to take in and out food from the refrigerating compartment 50 and the freezer compartment 70. Specifically, the refrigerating compartment 50 and the freezer compartment 70 may be partitioned by a partition wall 15. In this instance, the refrigerating compartment 50 may be further partitioned into a refrigerating section 50a and an alternate temperature section 50b that can be set to have a different temperature from that of the refrigerating section 50a. In this instance, the alternate temperature section 50b may be formed as a separate storage compartment as shown in FIGS. 1 to 3.

The refrigerator 10 maintains each of the refrigerating compartment 50 and the freezer compartment 70 at a target temperature which is set in advance. In this instance, the target temperature refers to a temperature which is set to be maintained by each of the refrigerating compartment 50 and the freezer compartment 70, and the target temperature may be differently set for each of the refrigerating compartment 50 and the freezer compartment 70. For example, the refrigerating compartment 50 may be maintained to have a temperature of approximately 3° C., and the freezer compartment 70 may be maintained to have a temperature of approximately −18° C. In this instance, the alternate temperature section 50b of the refrigerating compartment 50 may be maintained to have a temperature of approximately −5° C. to 1° C., unlike that of the refrigerating section 50a of the refrigerating compartment 50.

The refrigerating compartment 50 may be provided with an opened front surface so as to take in and out the food from the refrigerating compartment 50, and the opened front surface may be opened and closed by a pair of refrigerating compartment doors 20 which can be rotatably coupled to the refrigerating compartment 50 by a hinge member 25.

A refrigerating compartment door handle 21 may be provided on a front surface of the refrigerating compartment doors 20 in a vertical direction relative to the refrigerating compartment 50. A user may open the refrigerating compartment 50 by rotatably pulling the refrigerating compartment door 20 forward while gripping the refrigerating compartment door handle 21.

The refrigerating compartment door 20 may adopt a heat insulating structure so as to prevent cold air inside the refrigerating compartment 50 from leaking, and prevent warm air outside the refrigerating compartment 50 from being introduced into the freezer compartment 70.

In addition, an interface unit 310 of FIG. 1 may be provided on the front surface of the refrigerating compartment door 20. The interface unit 310 provides interaction between a user and the refrigerator 10.

In addition, a door guard 22 behind which food may be stored may be provided on the rear surface of the refrigerating compartment door 20.

In addition, the shelf 52 may be provided inside the refrigerating compartment 50, so it is possible to conveniently store food.

As described above, the refrigerating compartment 50 may be partitioned into the refrigerating section 50a and the alternate temperature section 50b. That is, the alternate temperature section 50b may be separately partitioned inside the refrigerating compartment 50. The alternate temperature section 50b may be set to have the same target temperature as that of the refrigerating section 50a, but set to have a different target temperature from that of the refrigerating section 50a.

That is, the alternate temperature section 50b may be maintained to have a different temperature from those of the refrigerating section 50a and the freezer compartment 70. Thus, it is preferable that the alternate temperature section 50b be provided in such a manner that temperature transmission with the refrigerating section 50a or the freezer compartment 70 is prevented to minimize a loss due to heat exchange.

For example, the alternate temperature section 50b may be separately provided as a storage compartment in the bottom of the refrigerating compartment 50 in the form of a drawer. Specifically, the alternate temperature section 50b may be partitioned with the refrigerating section 50a by a rectangular shaped-drawer 62 with one opened surface and a shelf 52. In this instance, the rectangular shaped-drawer 62 may allow food accommodated in the alternate temperature section 50b to be easily pulled out.

In addition, a first cold air supply unit 100 may be provided on the rear side of the refrigerating compartment 50. The first cold air supply unit 100 may supply cold air generated by the cold air generating unit 200 to the refrigerating compartment 50 so that the refrigerating section 50a and the alternate temperature section 50b can maintain to have the set target temperature.

In addition, a first temperature sensor 51 for detecting the temperature of the refrigerating section 50a may be provided in the refrigerating section 50a, and a second temperature sensor 61 for detecting the temperature of the alternate temperature section 50b may be provided in the alternate temperature section 50b. In this instance, the first temperature sensor 51 may be provided on a front surface of a first cover 120 as shown in FIG. 3, and the second temperature sensor 61 may be provided in the shelf 52, but they are not limited thereto. For example, the first temperature sensor 51 may be provided in the shelf 52 or the second temperature sensor 61 may be provided in a lower end of the first cover 120.

The refrigerator 10 may allow the refrigerating section 50a and the alternate temperature section 50b to maintain the set target temperature based on the first temperature sensor 51 and the second temperature sensor 61. Hereinafter, the supply of cold air for maintaining the set target temperature of the refrigerating section 50a is referred to as a refrigerating operation, and the supply of cold air for maintaining the set target temperature of the alternate temperature section 50b is referred to as an alternate temperature operation.

Meanwhile, the first cold air supply unit 100 is provided in the refrigerating compartment 50. The first cold air supply unit 100 may provide cold air to the refrigerating compartment 50 so that the temperatures of the refrigerating section 50a and the alternate temperature section 50b may converge to the set target temperatures.

The freezer compartment 70 may be provided with an opened front surface so as to store the food, and opened and closed so as to be slidably movable by a freezer compartment door 30. A freezer compartment door handle 31 for opening and closing the freezer compartment door 30 may be provided on the front surface of the freezer compartment door 30 in a lateral direction.

In addition, a second cold air supply unit 150 may be provided on the rear side of the freezer compartment 70, and the freezer compartment 70 may be maintained to have a set target temperature by the second cold air supply unit 150. In this instance, an operation for supplying cold air so that the freezer compartment 70 maintains the set target temperature is referred to as a freezing operation.

In addition, on one side of the freezer compartment 70, a third temperature sensor 71 for detecting the temperature inside the freezer compartment 70 may be provided.

Meanwhile, the refrigerator 10 may further include a machine compartment 19. The machine compartment 19 may be provided in a lower portion of the main body 11 to provide a space that can accommodate compartments for the driving of the refrigerator 10. For example, the machine compartment 19 may accommodate a compressor 210 and a condenser 220.

In FIGS. 1 to 3, a case in which the refrigerator 10 is a bottom freeze-type refrigerator in which the refrigerating compartment 50 is formed in the upper side of the refrigerator 10 and the freezer compartment 70 is formed in the lower side thereof as shown, but the present disclosure is not limited thereto. For example, obviously, the present disclosure may be applied to the refrigerator 10 that is a side-by-side type refrigerator in which the refrigerating compartment 50 and the freezer compartment 70 are partitioned on the left side and the right side, a refrigerator 10 that is a top mount-type refrigerator, or a refrigerator 10 in which these are mixed.

Figure 4:
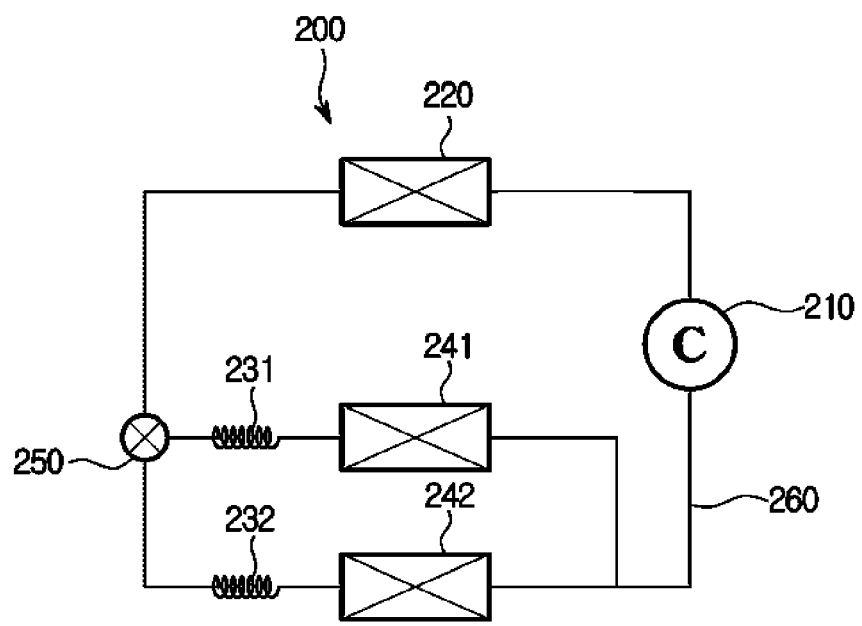
FIG. 4 is a view illustrating the flow of a refrigerant in a cold air generating unit in accordance with one embodiment of the present disclosure.

FIG. 4 is a view illustrating the flow of a refrigerant in a cold air generating unit in accordance with one embodiment of the present disclosure.

Referring to FIGS. 3 and 4, the cold air generating unit 200 generates cold air to be supplied to the refrigerating compartment 50 and the freezer compartment 70. Specifically, the cold air generating unit 200 may include the compressor 210 compress a refrigerant to yield a compressed refrigerant, the condenser 220 to condense the refrigerant to yield a condensed refrigerant, a first capillary tube 231 and a second capillary tube 232 to expand the refrigerant, the first evaporator 241 and the second evaporator 242 to evaporate the refrigerant to generate cold air, and a refrigerant pipe 260 to guide the refrigerant.

The compressor 210 may be installed in the machine compartment 19 provided in the lower portion of the main body 11 to compress the refrigerant into a high temperature and high pressure refrigerant using a rotational force of an electric motor or the like.

In this instance, the refrigerant may be compressed into a higher pressure refrigerant along with an increase in the rotational speed of the compressor 210. When the refrigerant is compressed into the higher pressure refrigerant, the evaporation in the first evaporator 241 and the second evaporator 242 may be further activated, so the cold air having a lower temperature may be generated.

The condenser 220 may be installed in the machine compartment 19 provided in the lower portion of the main body 11. The refrigerant having been compressed into the high temperature and high pressure refrigerant is condensed while passing through the condenser 220. In this instance, a fan may be disposed on one side of the condenser 220 to facilitate radiation of the compressed refrigerant.

A flow path switching valve 250 may adjust a flow path of the condensed refrigerant. The first evaporator 241 and the second evaporator 242 to which the condensed refrigerant is supplied may be selected by adjusting the flow path switching valve 250, so it is possible to select the refrigerating compartment 50 and the freezer compartment 70 to which the cold air is to be supplied. Specifically, when the flow path is opened in such a manner that the condensed refrigerant is supplied to the first evaporator 241 provided in the refrigerating compartment 50, the cold air may be supplied to the refrigerating compartment 50, and when the flow path is opened in such a manner that the condensed refrigerant is supplied to the second evaporator 242 provided in the freezer compartment 70, the cold air may be supplied to the freezer compartment 70. In addition, when the refrigerant is supplied to both the first evaporator 241 and the second evaporator 242, the freezer compartment 70 and the refrigerating compartment 50 may be simultaneously cooled.

In this instance, the flow path switching valve 250 may be implemented so as to be driven by an electromechanical force. For example, the flow path switching valve 250 may be configured to be driven by a solenoid or a motor.

The first capillary tube 231 and the second capillary tube 232 may create the refrigerant in a liquid state of low temperature and low pressure by expanding the condensed refrigerant. That is, the condensed refrigerant is expanded and becomes in the liquid state of low temperature and low pressure while passing through the first capillary tube 231 and the second capillary tube 232, and then moves to the first evaporator 241 and the second evaporator 242.

The first evaporator 241 and the second evaporator 242 may cool ambient air while evaporating the refrigerant in the liquid state of low temperature and low pressure which has passed through the first capillary tube 231 and the second capillary tube 232, and thereby may generate the cold air.

The refrigerant which has been completely evaporated is supplied to the compressor 210 again, so a cooling cycle is repeated. In addition, although not shown, in the first evaporator 241 and the second evaporator 242, a defrost heater to remove, using heat, frost formed on the first evaporator 241 and the second evaporator 242 in a process of generating the cold air may be provided.

As the first evaporator 241 and the second evaporator 242, roll-bond type evaporators that adopt a direct cooling system to exchange heat directly with air may be used. The roll-bond type evaporator may be provided in a platy form. The roll-bond type evaporator provided in the platy form may be disposed in the first cold air supply unit 100.

Figure 5:
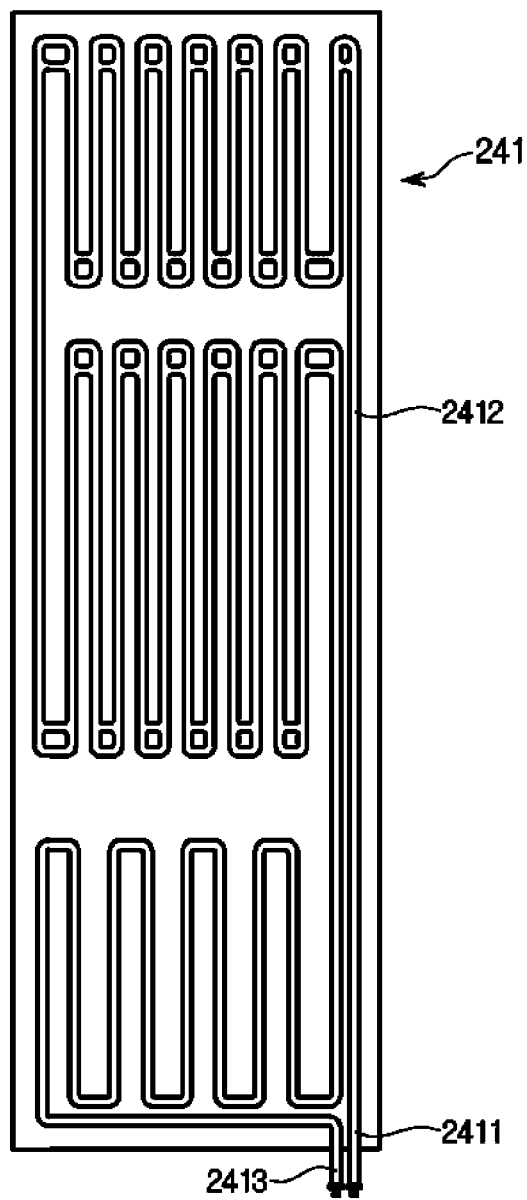
FIG. 5 is a view showing a first evaporator provided in a refrigerator in accordance with one embodiment of the present disclosure.

For example, the first evaporator 241 provided in the platy form may be disposed between the rear surface of the refrigerating compartment 50 and the first cover 120 to divide a cold air flow path 110 into a front flow path 111 and a rear flow path 112. FIG. 5 is a view showing a first evaporator provided in a refrigerator in accordance with one embodiment of the present disclosure.

Referring to FIG. 5, the first evaporator 241 in accordance with one embodiment of the present disclosure may have an inlet 2411 through which the refrigerant in the low-temperature and low-pressure state is introduced and an outlet 2413 through which the refrigerant having been circulated inside the first evaporator 241 is supplied to the compressor 210, and include a refrigerant flow path 2412 in which the refrigerant is exposed to the first cold air supply unit 100 to exchange heat while the refrigerant is circulated inside the first evaporator 241.

The first evaporator 241 may be designed to have a planar shape. The refrigerant having been introduced through the inlet 2411 of the first evaporator 241 passes through the refrigerant flow path 2412 having various shapes and a predetermined length inside the first evaporator 241, and then flows to the outside through the outlet 2413.

The refrigerant flow path 2412 of the first evaporator 241 may be formed into a multiple curved shape to further increase the heat exchange efficiency.

Referring to FIG. 3 again, the first cold air supply unit 100 and the second cold air supply unit 150 may supply the cold air generated by the cold air generating unit 200 to the refrigerating compartments 50 and the freezer compartment 70. Specifically, the first cold air supply unit 100 supplies the cold air to the refrigerating compartment 50, and the second cold air supply unit 150 supplies the cold air to the freezer compartment 70. Hereinafter, the first cold air supply unit 100 and the second cold air supply unit 150 will be described in detail.

The first cold air supply unit 100 supplies cold air generated by the first evaporator 241 to the refrigerating section 50*a* and the alternate temperature section 50*b*. The first cold air supply unit 100 may include the first evaporator 241, the first cover 120, and a first circulation fan 130.

The first cover 120 may be spaced apart from a rear surface 18 of the refrigerating section 50*a* by a predetermined distance to form the cold air flow path 110 through which the cold air generated by the first evaporator 241 is moved. A first passage 141 and a second passage 142 may be provided between the cold air flow path 110 and the refrigerating compartment 50.

The first evaporator 241 may be disposed in the cold air flow path 110 formed by the first cover 120 and the rear surface 18 of the refrigerating compartment 50. The position in which the first evaporator 241 is disposed is not limited. For example, the first evaporator 241 may be disposed between the first cover 120 and the rear surface 18 of the refrigerating compartment 50 to partition the cold air flow path 110. In this instance, the cold air flow path 110 formed on the front surface is referred to as the front flow path 111, and the cold air flow path 110 formed on the rear surface is referred to as the rear flow path 112. Hereinafter, the first cover 120 will be described in detail with reference to FIG. 6.

Figure 6:
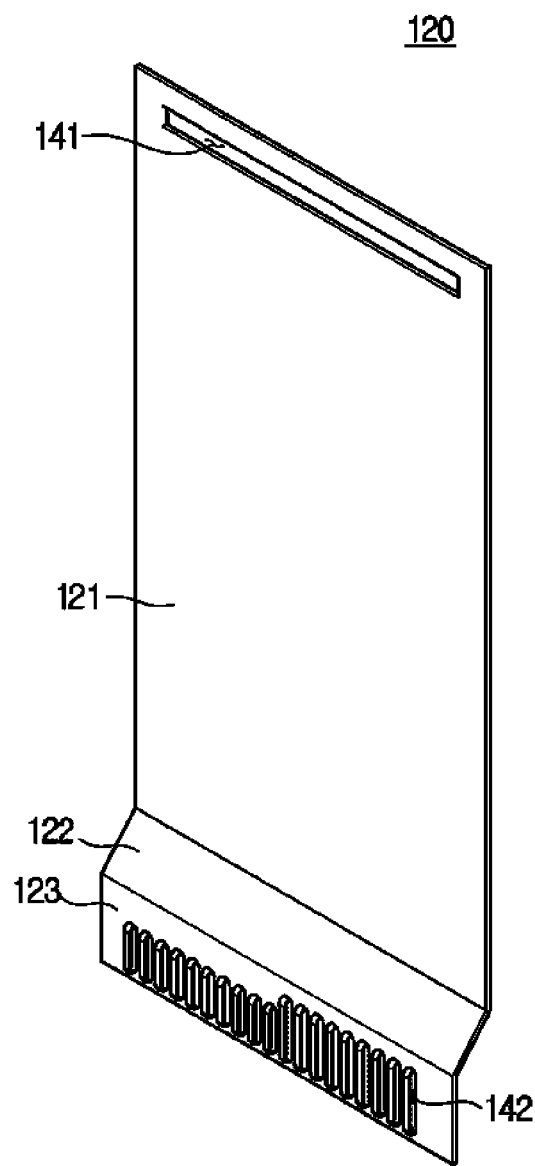
FIG. 6 is a perspective view showing a first cover in accordance with one embodiment of the present disclosure.

FIG. 6 is a perspective view showing a first cover in accordance with one embodiment of the present disclosure. Referring to FIG. 6, the first cover 120 may include a first plate 121, a second plate 122, and a third plate 123.

The first plate 121 may be formed to extend downward from the top of the first cover 120. The first plate 121 may be provided in parallel to the rear surface 18 of the refrigerating compartment 50 in a state of being coupled to the refrigerating compartment 50. A first passage 141 may be provided above the first plate 121. Through the first passage 141, the cold air flow path 110 and the refrigerating section 50*a* may be connected to each other. That is, through the first passage 141, the cold air of the cold air flow path 110 may be introduced into the refrigerating section 50*a*.

The second plate 122 extends to be bent forward from the bottom of the first plate 121 to connect the first plate 121 and the third plate 123.

The third plate 123 may be provided to extend downward from the bottom of the second plate 122. The third plate 123 may be formed in parallel to the first plate 121. The third plate 123 may be connected to the second plate 122 which extends to be bent forward and positioned in front of the first plate 121.

A second passage 142 may be formed in the third plate 123. In this instance, the second passage 142 may be provided as a plurality of slots. Through the second passage 142, the cold air flow path 110 and the alternate temperature section 50*b* are connected to each other. That is, through the second passage 142, the cold air of the cold air flow path 110 may be introduced into the alternate temperature section 50*b*.

In this instance, one of the first passage 141 and the second passage 142 may be used as a discharge port, and the other one thereof may be used as an inlet port. This will be described in detail below.

The first circulation fan 130 circulates the cold air. The first circulation fan 130 may allow the cold air of the cold air flow path 110 to flow, so the cold air generated in the first evaporator 241 is evenly supplied to the refrigerating compartment 50.

The second cold air supply unit 150 supplies the cold air generated by the second evaporator 242 to the freezer compartment 70. The second cold air supply unit 150 may include the second evaporator 242, a second cover 157, and a second circulation fan 152.

The second cover 157 may be provided between the rear surface of the freezer compartment 70 and the second evaporator 242. As shown in FIG. 3, the second cover 157 may be provided in contact with the second evaporator 242, but provided to be spaced apart from the second evaporator 242 by a predetermined distance in the same manner as that in the first cover 120.

The second circulation fan 152 may generate a flow of cold air inside the freezer compartment 70.

Figure 7:
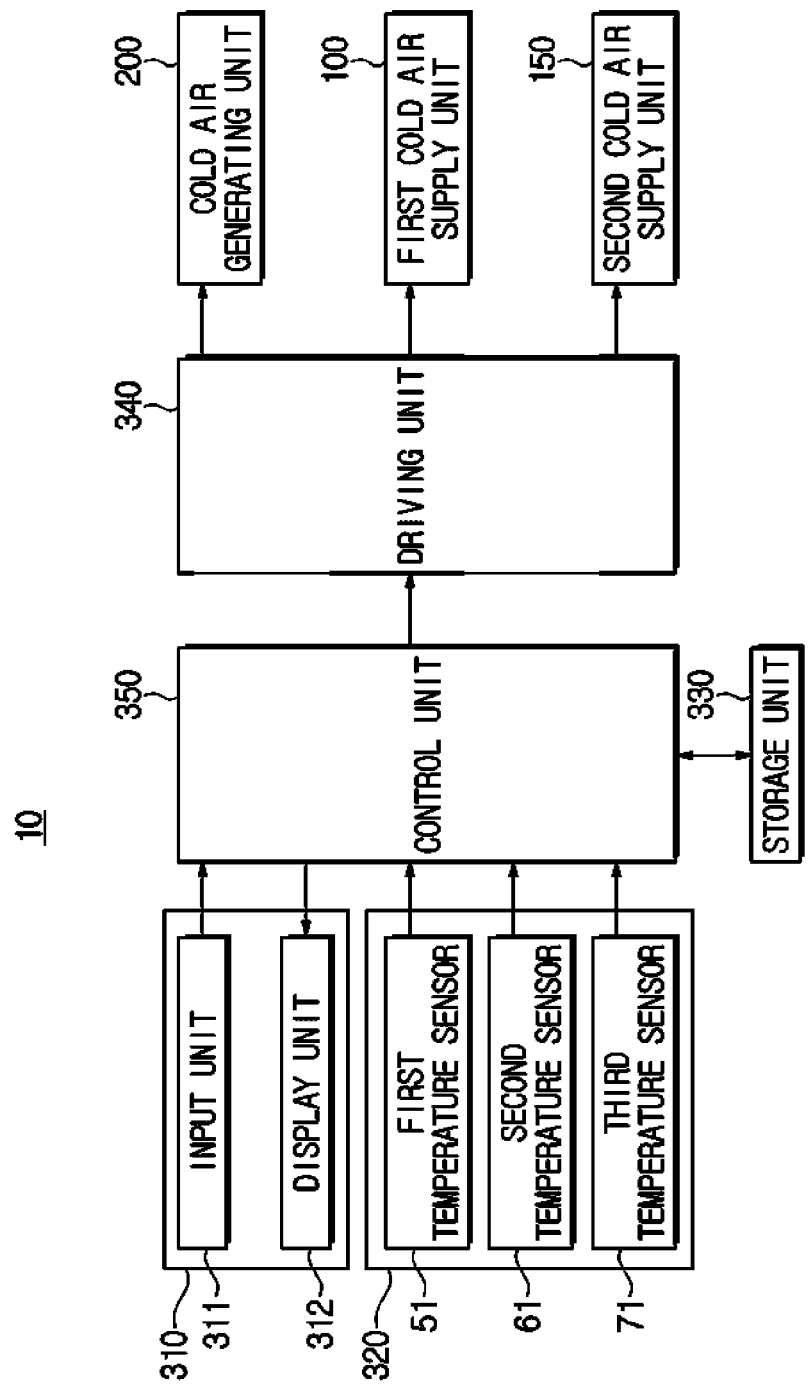
FIG. 7 is a control block diagram illustrating the driving of a refrigerator in accordance with one embodiment of the present disclosure.

Hereinafter, the driving of the refrigerator 10 in accordance with one embodiment of the present disclosure will be described in detail. FIG. 7 is a control block diagram illustrating the driving of a refrigerator in accordance with one embodiment of the present disclosure.

Referring to FIG. 7, the refrigerator 10 in accordance with one embodiment of the present disclosure includes the interface unit 310 to interact with a user, a sensor unit 320 to detect the state of each of the refrigerating compartment 50 and the freezer compartment 70, a storage unit 330 to store data associated with driving or operating the refrigerator 10, a control unit 350 to control the driving of the refrigerator 10, and a driving unit 340 to drive the cold air generating unit 200, and the first cold air supply unit 100 and the second cold air supply unit 150 in accordance with the control of the control unit 350.

The interface unit 310 may include an input unit 311 and a display unit 312. The input unit 311 receives a control command that controls driving and/or operating of the refrigerator 10 from the user, and generates and outputs one or more electric signals corresponding to the input control command.

For example, the input unit 311 may include devices such as a touch sensor, a mouse, a keyboard, a joystick, buttons, a dial, a slider switch, and the like. Here, the touch sensor is a device for detecting a touch input of a user and may use a capacitive technology, a resistive technology, an infrared technology, and a surface acoustic wave technology, but the present disclosure is not limited thereto. For example, any of technologies which have been already known or will be developed in the future may be used.

The display unit 312 provides a variety of information associated with the refrigerator 10 to the user. For example, the display unit 312 may provide setting information or driving state information of the refrigerator 10 to the user.

For example, the display unit 312 may be implemented as a plasma display panel, a liquid crystal display panel, a light-emitting diode panel, an organic light-emitting diode panel, or an active organic light-emitting panel, or an audio output means such as a speaker, but the present disclosure is not limited thereto.

In addition, the display unit 312 and the input unit 311 may be integrally configured. For example, the display unit 312 and the input unit 311 may be implemented as an integrated touch screen as shown in FIG. 1. In this manner, when the display unit 312 and the input unit 311 are implemented as the touch screen, a user may interact with the refrigerator 10 using gestures.

The sensor unit 320 may detect temperatures of the refrigerating compartment 50 and the freezer compartment 70. Specifically, the sensor unit 320 may include the first temperature sensor 51 to detect, measure, or sense the temperature of the refrigerating section 50a, the second temperature sensor 61 to detect, measure, or sense the temperature of the alternate temperature section 50b, and the third temperature sensor 71 to detect, measure, or sense the temperature of the freezer compartment 70.

In this instance, the first temperature sensor 51, the second temperature sensor 61, and the third temperature sensor 71 may be implemented as a contact type temperature sensor or a non-contact type temperature sensor. Specifically, the first temperature sensor 51, the second temperature sensor 61, and the third temperature sensor 71 may be implemented as an resistance temperature detector (RTD) temperature sensor using a resistance change of metal according to a temperature change, a thermistor temperature sensor using a semiconductor resistance change according to a temperature change, a thermocouple temperature sensor using an electromotive force generated at both ends of the junction of two different kinds of metal wires having different materials, and an integrated circuit (IC) temperature sensor using a voltage across both ends of a transistor which is changed according to the temperature or current-voltage characteristics of a P-N junction. However, the first temperature sensor 51, the second temperature sensor 61, and the third temperature sensor 71 are not limited thereto, and may adopt all possible means for detecting the temperature.

The storage unit 330 may store a variety of information associated with the driving or the operations of the refrigerator 10. For example, the storage unit 330 may store data such as firmware, application, and the like, directly for driving the refrigerator 10. In addition, the storage unit 330 may store temporary data generated by the driving of the refrigerator 10.

The storage unit 330 may include a high-speed random access memory (RAM), a magnetic disk, a Static Random-Access Memory (S-RAM), a Dynamic Random-Access Memory (D-RAM), a Read-Only Memory (ROM), and the like, but is not limited thereto. In addition, the storage unit 330 may be detachably mounted to the refrigerator 10. For example, the storage unit 330 may include a Compact Flash (CF) card, a Secure Digital (SD) card, a Smart Media (SM) card, a Multi-Media Card (MMC), or a memory stick.

The driving unit 340 drives individual components of the refrigerator 10 in accordance with a control signal of the control unit 350. The driving unit 340 may be implemented as a driving circuit to drive the individual components such as the cold air generating unit 200, the first cold air supply unit 100, the second cold air supply unit 150, and the like, of the refrigerator 10.

The control unit 350 generally controls the operations of the refrigerator 10. The control unit 350 may correspond to one or a plurality of processors. In this instance, the processor may be implemented as an array of a plurality of logic gates, or implemented as a combination of a general-purpose microprocessor and a memory in which a program being executable in the microprocessor is stored.

The control unit 350 may control a cooling operation so that the target temperature of each of the refrigerating compartment 50 and the freezer compartment 70 can be maintained. That is, the cooling operation refers to the supply of the cold air so that the actual temperature of each of the refrigerating compartment 50 and the freezer compartment 70 converges to the target temperature. In this instance, the actual temperature refers to a temperature measured by each of the first temperature sensor 51, the second temperature sensor 61, and the third temperature sensor 71, and the target temperature refers to a temperature to be maintained by each of the refrigerating compartment 50 and the freezer compartment 70. The cooling operation may include a refrigerating operation and a freezing operation. Hereinafter, the operation of the refrigerator 10 will be described in detail.

Figure 8:
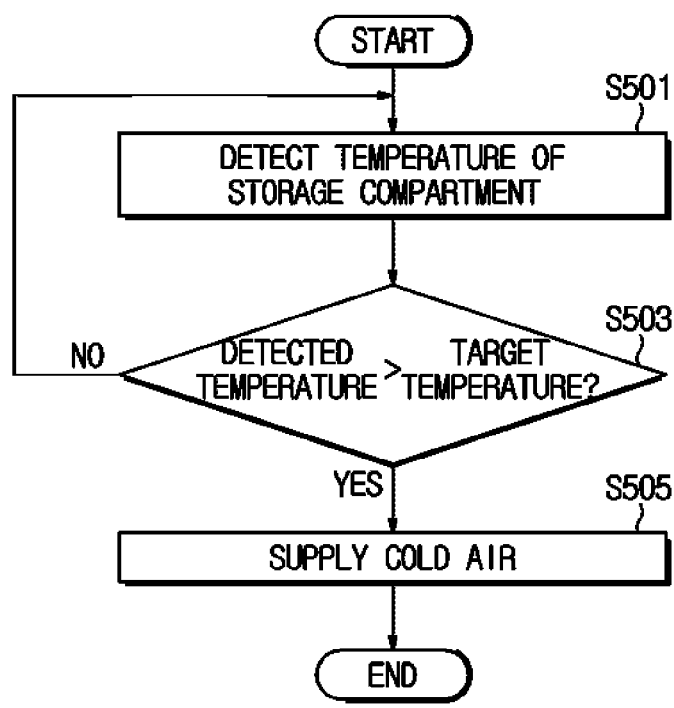
FIG. 8 is a schematic view showing the cooling operation of a refrigerator in accordance with one embodiment of the present disclosure.

FIG. 8 is a schematic view showing the cooling operation of the refrigerator 10 of FIG. 1 in accordance with one embodiment of the present disclosure.

Referring to FIG. 8, in operation S501, the control unit 350 detects the temperature of each of the refrigerating compartment 50 and the freezer compartment 70. The temperature of each of the refrigerating compartment 50 and the freezer compartment 70 may be consecutively detected, for example, at a predetermined period. Specifically, the control unit 350 detects the temperature of the refrigerating section 50a via the first temperature sensor 51, detects the temperature of the alternate temperature section 50b via the second temperature sensor 61, and detects the temperature of the freezer compartment 70 via the third temperature sensor 71.

In operation S503, the control unit 350 compares whether the detected temperature is higher than the target temperature. In this instance, the target temperature may be differently set for the refrigerating compartment 50 and the freezer compartment 70. For example, the refrigerating section 50a may be set to have a target temperature of approximately 3° C., the freezer compartment 70 may be set to have a target temperature of approximately −18° C., and the alternate temperature section 50b may be set to have a target temperature of approximately −5° C. to 1° C. Hereinafter, for convenience of description, the temperature of the alternate temperature section 50b is set to be lower than the temperature of the refrigerating section 50a.

When the detected temperature is higher than the target temperature (YES path of operation S503), the control unit 350 starts an operation for supplying cold air. As described above, the refrigerator 10 in accordance with one embodiment is capable of independent cooling, and the control unit 350 may control the cold air to be supplied to only the refrigerating compartment 50 and the freezer compartment 70 in which the detected temperature is higher than the target temperature. For example, when the temperature of the freezer compartment 70 is lower than the target temperature, the control unit 350 may perform a freezing operation. Hereinafter, the cooling operation when the temperature of the refrigerating compartment 50 is lower than the target temperature will be described with reference to FIGS. 9 to 11.

Figure 9:
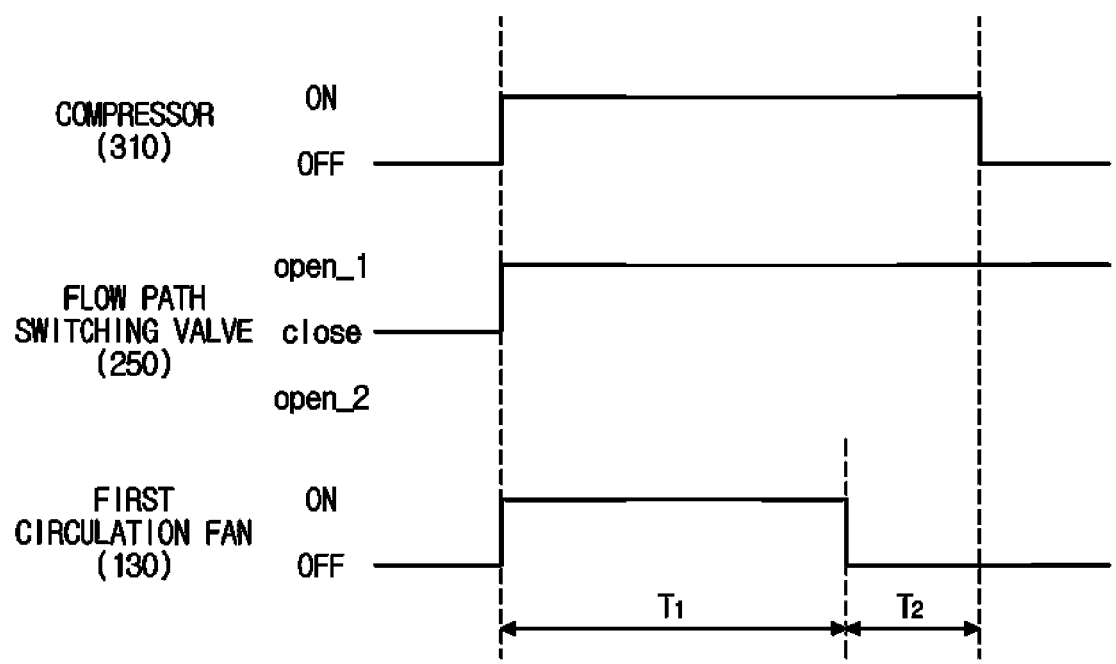
FIG. 9 illustrates an example of the operation of a refrigerator in accordance with one embodiment of the present disclosure.
Figure 10:
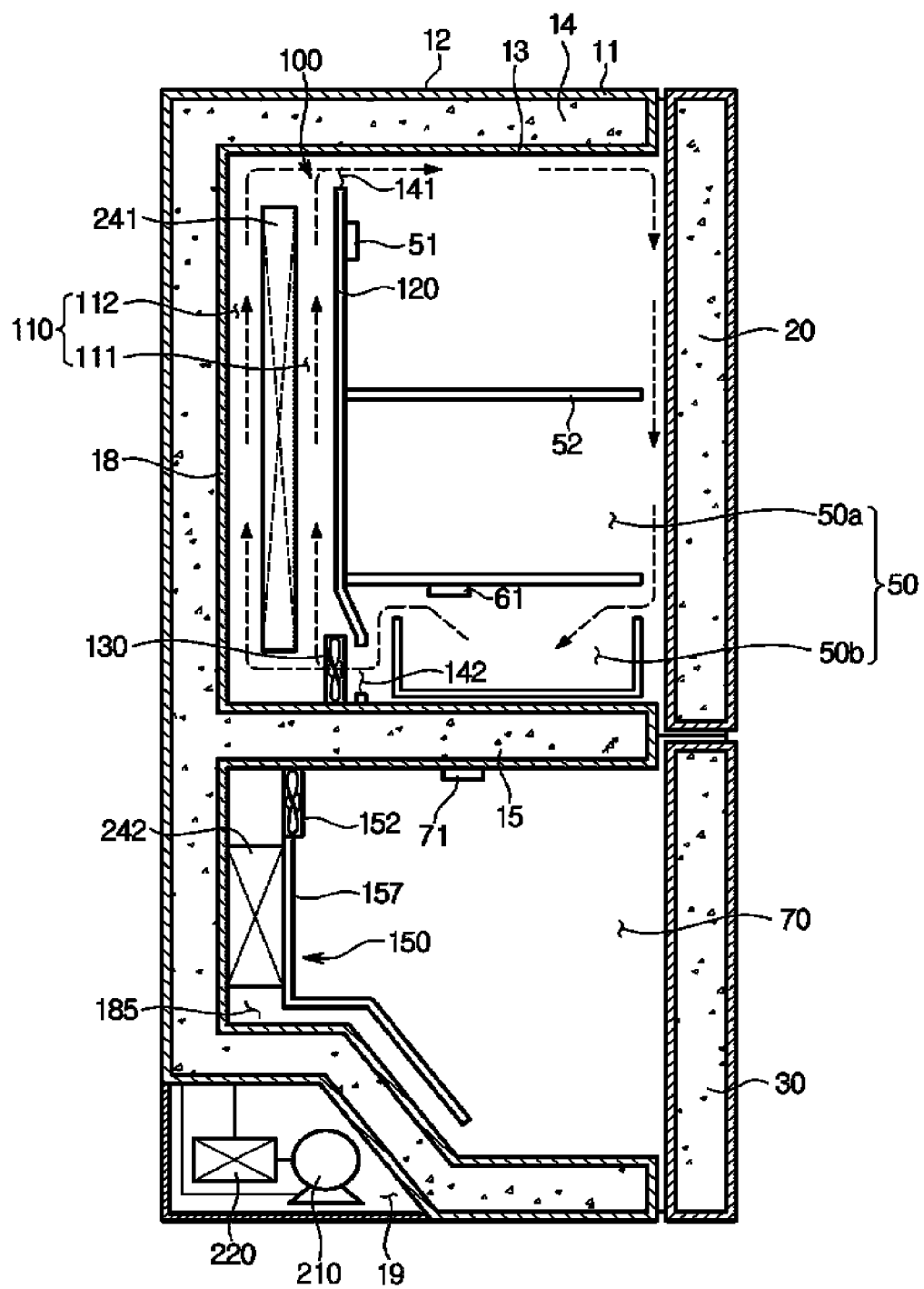
FIG. 10 illustrates the flow of cold air in a refrigerating operation section of FIG. 8.
Figure 11:
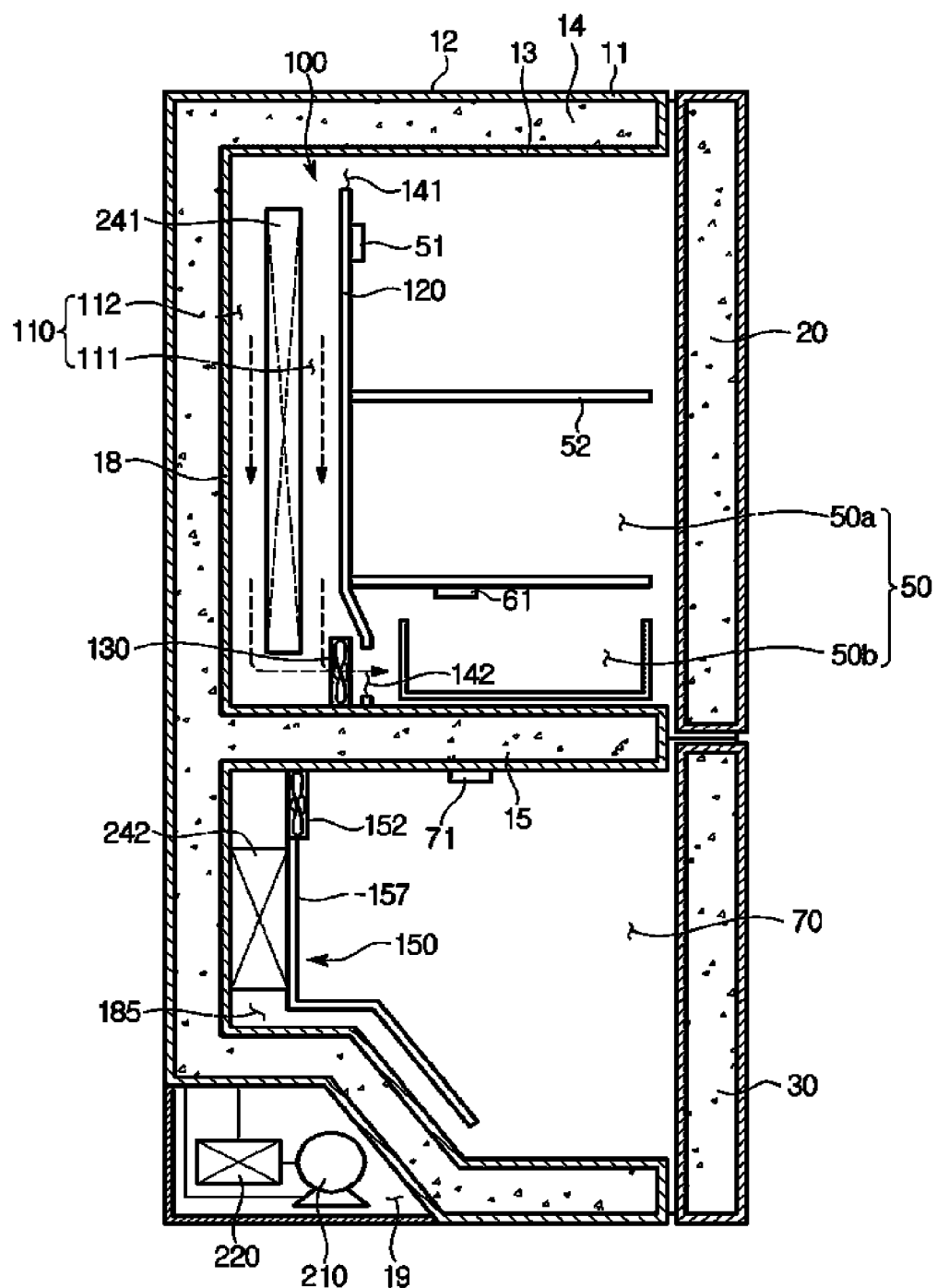
FIG. 11 illustrates the flow of cold air in an alternate temperature operation section of FIG. 8.

FIG. 9 illustrates an example of the operation of the refrigerator 10 in accordance with one embodiment of the present disclosure. FIG. 9 illustrates the cooling operation when the target temperature of the alternate temperature section 50b is lower than the target temperature of the refrigerating section 50a. FIG. 10 illustrates the flow of cold air in a refrigerating operation section, and FIG. 11 illustrates the flow of cold air in an alternate temperature operation section.

Referring to FIGS. 3, 7, and 9, the refrigerator 10 may perform a refrigerating operation $T_1$ for supplying the cold air to the refrigerating compartment 50 and an alternate temperature operation $T_2$ for supplying the cold air to the alternate temperature section 50b.

When the refrigerating operation $T_1$ starts, the control unit 350 may switch the compressor 210 into a turn-on state to operate a cooling cycle of compression, condensation, expansion, and evaporation. The compressor 210 may be rotated at a preset rotational speed. In this instance, the rotational speed of the compressor may be different according to a temperature error of the refrigerating compartment 50 and the freezer compartment 70. For example, as the actual temperature of each of the refrigerating compartment 50 and the freezer compartment 70 drops below the target temperature of each of the refrigerating compartment 50 and the freezer compartment 70, the compressor 210 may operate at a higher speed.

In addition, the control unit 350 may supply the cold air to the cold air flow path 110 of the first cold air supply unit 100 by opening the flow path switching valve 250 towards the first evaporator 241. Specifically, the refrigerant is compressed by the rotational force of the compressor 210, and the compressed refrigerant is condensed by the condenser 220.

Next, the condensed refrigerant is expanded in the first capillary tube 231 and introduced into the first evaporator 241 in a liquid state of low temperature and low pressure. The refrigerant having been introduced into the first evaporator 241 may cool the air of the cold air flow path 110 of the first cold air supply unit 100 to generate the cold air while it evaporates.

By the cold air generated by the first evaporator 241 in this manner, the refrigerating section 50a and the alternate temperature section 50b are cooled. The control unit 350 switches the first circulation fan 130 into a turn-on state in order to facilitate the circulation of the cold air. In this instance, the first circulation fan 130 may be rotated at a predetermined rotational speed.

When the first circulation fan 130 is driven, the cold air generated by the first evaporator 241 may flow as shown in FIG. 10. Specifically, the air of the alternate temperature section 50b may be introduced through the second passage 142 by a suction force generated by the first circulation fan 130.

The air introduced through the second passage 142 rises along the cold air flow path 110 due to a pressure difference. In this instance, the rising air is cooled by the first evaporator 241 and discharged to the refrigerating section 50a through the first passage 141. The cold air having been discharged to the first passage 141 in this manner cools the refrigerating section 50a and the alternate temperature section 50b while it is circulated in the refrigerating section 50a and the alternate temperature section 50b, and then is introduced into the second passage 142 again.

When a difference between the actual temperature of the refrigerating section 50a and the target temperature of the refrigerating section 50a converges to a threshold value (e.g., 0.3° C.) or less, the control unit 350 terminates the refrigerating operation $T_1$. When the refrigerating operation $T_1$ is terminated, the control unit 350 starts the alternate temperature operation $T_2$. In the refrigerating operation $T_1$, the cold air may flow in the clockwise direction by the first circulation fan 130 as shown in FIG. 10, so that the temperature of the refrigerating section 50a to which the cold air is directly supplied becomes relatively lower than the temperature of the alternate temperature section 50b. Accordingly, the control unit 350 may perform the alternate temperature operation $T_2$ so that the alternate temperature section 50b maintains a lower temperature than that of the refrigerating section 50a, and thereby may additionally cool the alternate temperature section 50b.

Upon the alternate temperature operation $T_2$, the alternate temperature section 50b may be cooled by deflection of the cold air. The control unit 350 switches the first circulation fan 130 into a turn-off state so that the cold air of the cold air flow path 110 can be introduced into the alternate temperature section 50b by the deflection of the cold air.

Specifically, when the first circulation fan 130 stops, the flow of the cold air caused by the first circulation fan 130 is stopped, and therefore the cold air of the cold air flow path 110 having been cooled by the first evaporator 241 moves in the downward direction by a convection phenomenon, as shown in FIG. 11.

The cold air having moved to below the cold air flow path 110 in this manner is introduced into the alternate temperature section 50b via the second passage 142, and thereby cools the alternate temperature section 50b. When an error between the actual temperature of the alternate temperature section 50b and the target temperature of the alternate temperature section 50b is a threshold value or less, the control unit 350 switches the compressor 210 into a turn-off state to terminate the cooling operation.

Meanwhile, upon the alternate temperature operation $T_2$, the control unit 350 may maximize the deflection of the cold air by controlling the compressor 210 to be rotated at a higher speed. The compressor 210 compresses the refrigerant at a higher pressure along with an increase in the rotational speed of the compressor 210. When the refrigerant of high pressure is evaporated in the first evaporator 241, the surface temperature of the first evaporator 241 is further decreased.

That is, when the rotational speed of the compressor is increased, the temperature of the cold air generated by the first evaporator 241 is further decreased, and thereby the deflection of the cold air is further activated so the cooling of the alternate temperature section 50b may be further activated. For example, the control unit 350 may drive the compressor at 1400 revolutions per minute (RPM) upon the refrigerating operation and drive the compressor at 1800 RPM upon the alternate temperature operation, thereby maximizing the deflection of the cold air upon the alternate temperature operation.

Meanwhile, in the alternate temperature operation $T_2$ of FIG. 9, a case in which the first circulation fan 130 is turned off has been described, but the first circulation fan 130 may be rotated in the opposite direction to that in the refrigerating operation $T_1$ to facilitate the introduction of the cold air into the alternate temperature section 50b.

In addition, in FIG. 9, a case in which the alternate temperature operation $T_2$ starts after the refrigerating operation $T_1$ is terminated has been described, but the refrigerating operation $T_1$ and the alternate temperature operation $T_2$ may be carried out alternately until the temperature of each of the refrigerating section 50a and the alternate temperature section 50b reaches the target temperature, or the alternate temperature operation $T_2$ and the refrigerating operation $T_1$ may be sequentially carried out.

By cooling the alternate temperature section 50b using the deflection of the cold air of the cold air flow path in this manner, it is possible to maintain the temperature of the alternate temperature section 50b to be lower than the temperature of the refrigerating section 50a without a separate additional component.

In addition, driving an additional fan or damper for the cooling of the alternate temperature section 50b may become optional, and thereby may increase the cooling efficiency of the alternate temperature section 50b.

Figure 12:
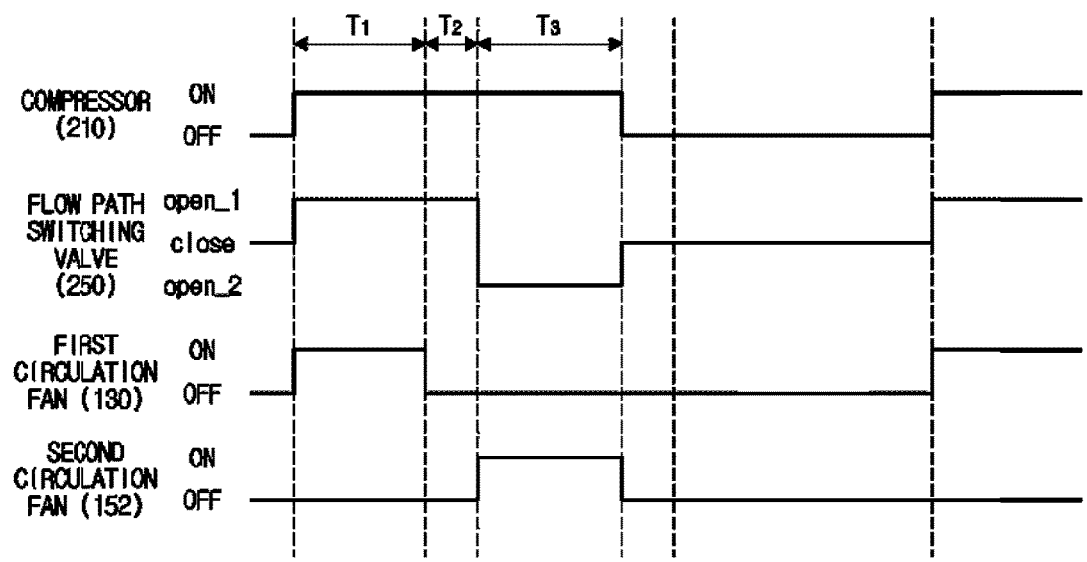
FIG. 12 illustrates an example of a cooling operation of a refrigerator in accordance with one embodiment of the present disclosure.
Figure 13:
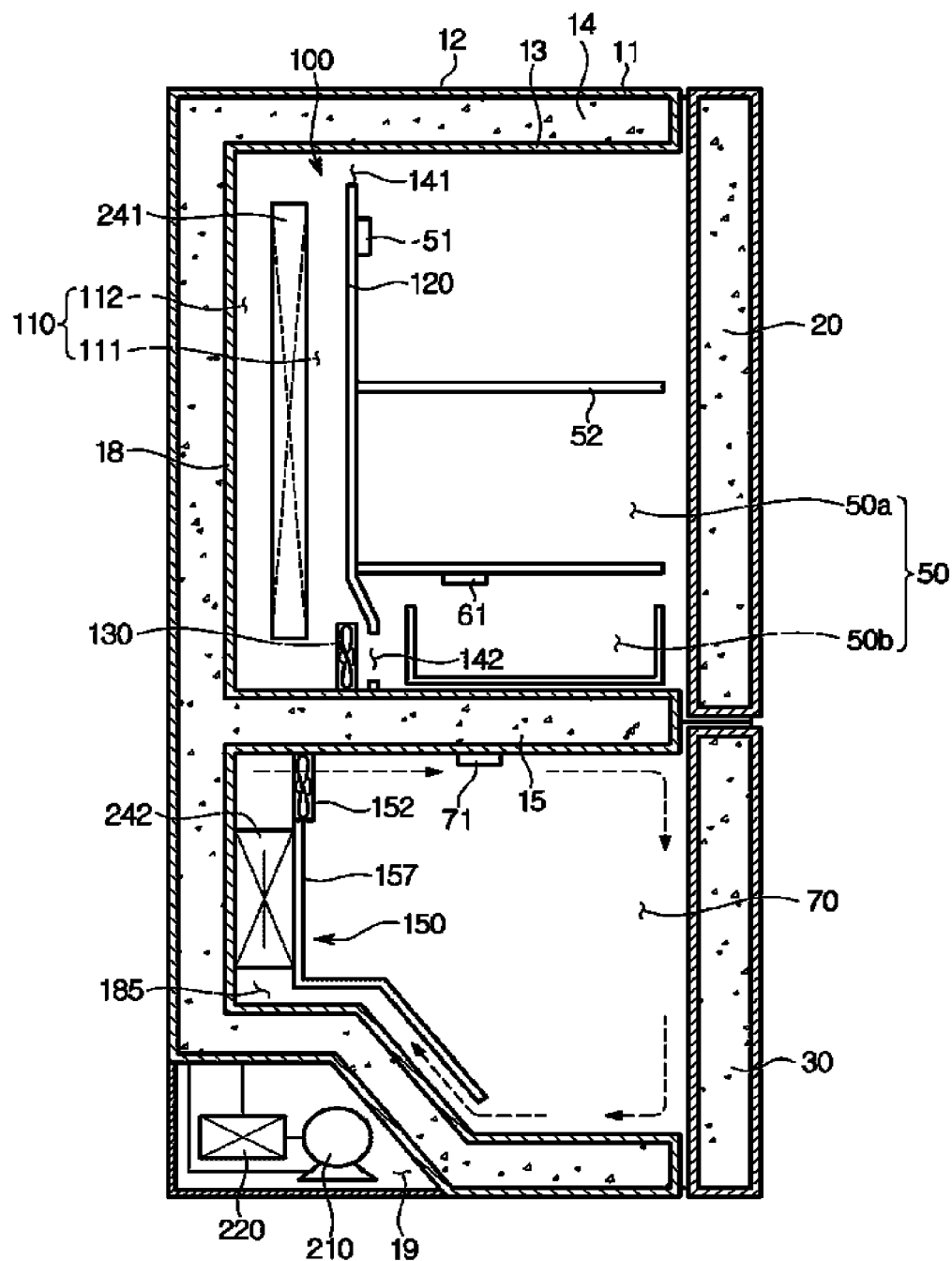
FIG. 13 illustrates the flow of cold air in a freezing operation section of FIG. 12.

FIG. 12 illustrates an example of a cooling operation of a refrigerator in accordance with one embodiment of the present disclosure, and FIG. 13 is a view illustrating the flow of cold air in a freezing operation section of FIG. 12.

Referring to FIGS. 3, 7, and 12, the refrigerator may sequentially carry out the refrigerating operation $T_1$, the alternate temperature operation $T_2$, and a freezing operation $T_3$.

The control unit 350 first starts the refrigerating operation $T_1$. When the refrigerating operation $T_1$ starts, the control unit 350 switches the compressor 210 into a turn-on state so the cooling cycle starts, controls the flow path switching valve 250 to be opened towards the first evaporator 241, and switches the first circulation fan 130 into an ON state.

When the refrigerating operation $T_1$ is carried out in this manner, the cold air is generated in the cold air flow path 110 by the first evaporator 241, and the generated cold air of the cold air flow path 110 flows by the first circulation fan 130 as shown in FIG. 10, and thereby cools the refrigerating compartment 50 while it is circulated via the first passage 141, the refrigerating section 50a, the alternate temperature section 50b, and the second passage 142 in the stated order.

When the refrigerating section 50a reaches the set target temperature, the control unit 350 may terminate the refrigerating operation $T_1$ and start the alternate temperature operation $T_2$. When the alternate temperature operation $T_2$ starts, the first circulation fan 130 is switched into an OFF state.

When the operation of the first circulation fan 130 is stopped, the cold air of the cold air flow path 110 having been cooled by the first evaporator 241 is moved towards the second passage 142 by convection. Next, the cold air having been moved towards the second passage 142 is supplied to the alternate temperature section 50b via the second passage 142. The alternate temperature section 50b is further cooled by the cold air having been supplied via the second passage 142, and therefore the temperature of the alternate temperature section 50b becomes lower than the temperature of the refrigerating section 50a. That is, by the deflection of the cold air of the cold air flow path 110, the alternate temperature section 50b is further cooled.

When the alternate temperature section 50b reaches the set target temperature through the alternate temperature operation $T_2$, the control unit 350 may terminate the alternate temperature operation $T_2$ and start the freezing operation $T_3$. When the freezing operation $T_3$ starts, the control unit 350 may open the flow path switching valve 250 towards the second evaporator 242, and switch the second circulation fan 152 into a turn-on state.

When the freezing operation $T_3$ is started, the air around the second cold air supply unit 150 is cooled by the second evaporator 242 so the cold air is generated, and the cold air is circulated inside the freezer compartment 70 by the second circulation fan 152.

When the freezer compartment 70 reaches the set target temperature through the freezing operation $T_3$, the control unit 350 terminates the freezing operation $T_3$. Specifically, the control unit switches the compressor 210 into a turn-off state, so that the operation of the compressor 210 is stopped and the flow path switching valve 250 is closed. In addition, it is possible to switch both the first circulation fan 130 and the second circulation fan 152 into a turn-off state.

In FIG. 12, a case in which the refrigerating operation is carried out prior to the freezing operation $T_3$ has been described, but the freezing operation $T_3$ may be carried out prior to the refrigerating operation.

Figure 14:
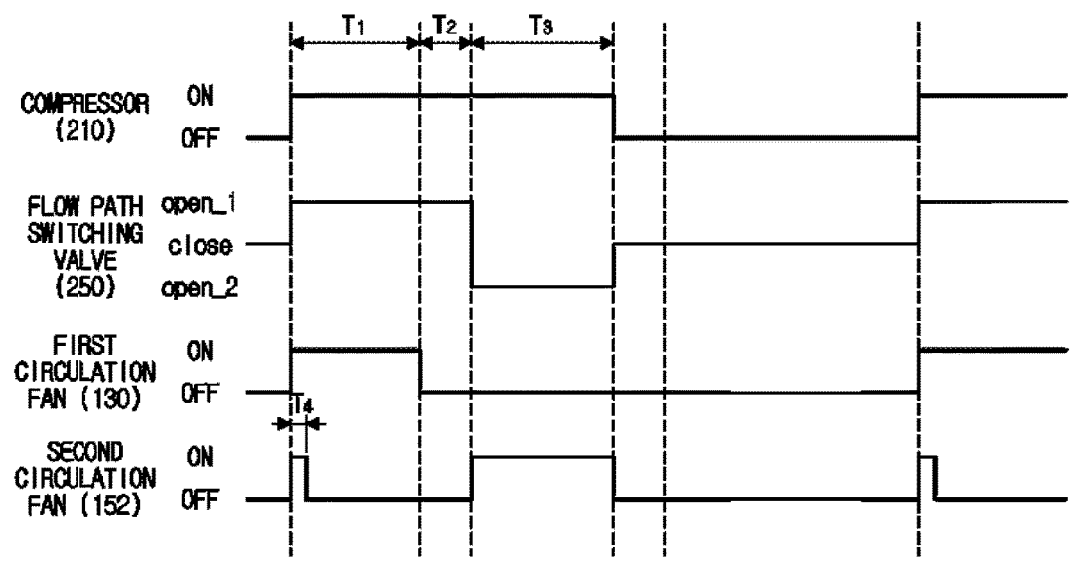
FIG. 14 illustrates an example of a refrigerant recovery operation.
Figure 15:
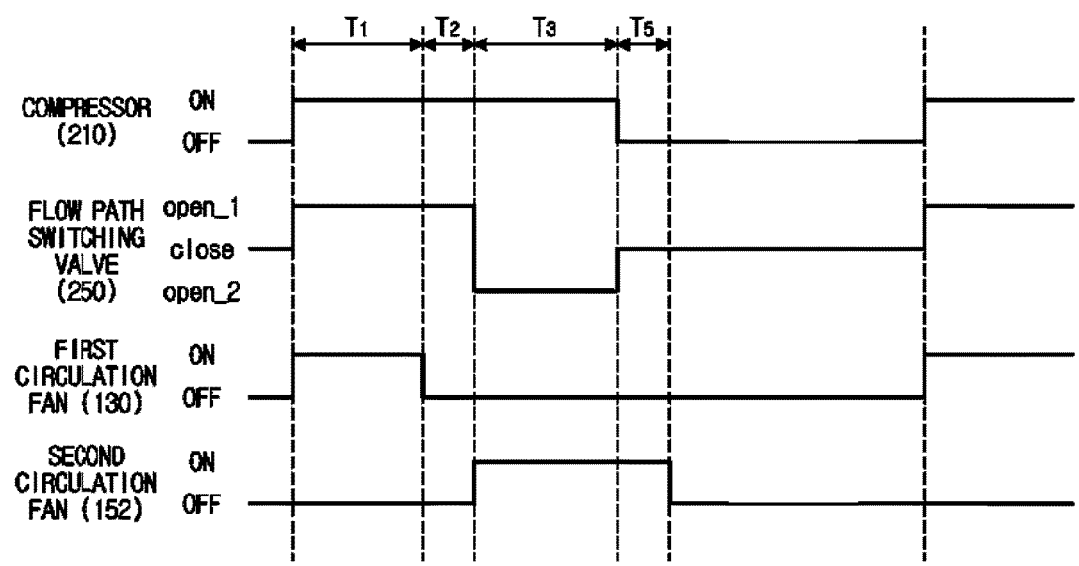
FIG. 15 illustrates another example of a refrigerant recovery operation.

Meanwhile, the cooling operation may further include an operation for the recovery of the refrigerant. FIG. 14 illustrates an example of a refrigerant recovery operation, and FIG. 15 illustrates another example of a refrigerant recovery operation. When the refrigerating operation T1 is started as shown in FIG. 14, the recovery of the refrigerant may be started during a preset time T4. Specifically, the control unit 350 drives the second circulation fan 152 during the preset time T4 together with the start of the refrigerating operation T1. When the second circulation fan 152 is driven during the preset time T4 in this manner, the refrigerant remaining in the second evaporator 242 is introduced into the compressor 210 again while being evaporated, thereby increasing the efficiency of the refrigerating operation T1.

Meanwhile, after the supply of the refrigerant to the first evaporator 241 and the second evaporator 242 is stopped, the control unit may drive the first circulation fan 130 and the second circulation fan 152 during the preset time to recover the refrigerant remaining in the first evaporator 241 and the second evaporator 242 to the compressor 210.

Specifically, after the freezing operation $T_3$ is terminated, the control unit 350 may perform a refrigerant recovery operation during a preset time $T_5$ as shown in FIG. 15. After the freezing operation $T_3$ is terminated, the control unit 350 further drives the second circulation fan 152 during the preset time $T_5$, and then turns off the second circulation fan 152. When the second circulation fan 152 is driven during the preset time $T_5$ in this manner, the refrigerant remaining in the second evaporator 242 may be introduced into the compressor 210 again while being evaporated, so that it is possible to recover the remaining refrigerant and additionally cool the freezer compartment 70 using the refrigerant remaining in the second evaporator 242.

In FIG. 12, a case in which the alternate temperature operation $T_2$ is carried out between the refrigerating operation $T_1$ and the freezing operation $T_3$ has been described, but the alternate temperature operation $T_2$ may be carried out between the refrigerating operation $T_1$ and the freezing operation $T_3$. Hereinafter, this will be described in detail with reference to FIG. 16.

Figure 16:
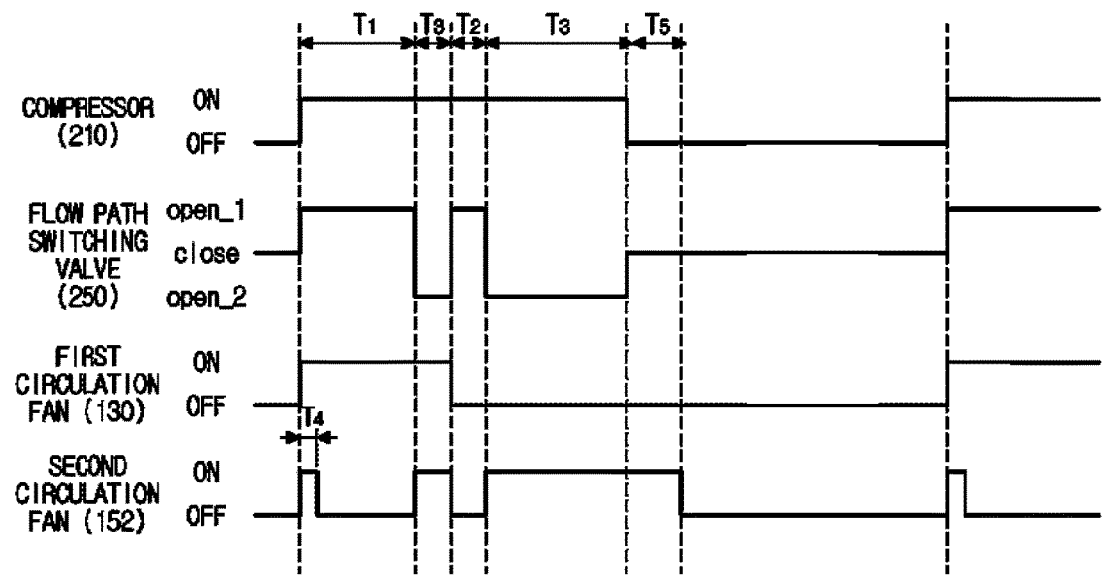
FIG. 16 illustrates another example of a cooling operation of a refrigerator in accordance with one embodiment of the present disclosure.

FIG. 16 illustrates another example of a cooling operation of a refrigerator in accordance with one embodiment of the present disclosure. Referring to FIGS. 3, 7, and 16, the control unit 350 first starts the refrigerating operation $T_1$. When the refrigerating operation $T_1$ is started, the compressor 210 is switched into an ON state so the cooling cycle is started, the flow path switching valve 250 is opened toward the first evaporator 241 so the cold air is generated in the cold air flow path 110, and the first circulation fan 130 is driven so the cold air of the cold air flow path 110 is circulated as shown in FIG. 10. In addition, the second circulation fan 152 is driven during the preset time $T_4$ together with the start of the refrigerating operation $T_1$, so it is possible to recover the refrigerant remaining in the second evaporator 242.

When the refrigerating section 50a reaches the set target temperature, the control unit 350 terminates the refrigerating operation $T_1$ and starts the freezing operation $T_3$. Specifically, the control unit 350 opens the flow path switching valve 250 towards the second evaporator 242 so that the refrigerant is supplied to the second evaporator 242, and supplies the cold air to the second cold air supply unit 150. In addition, the control unit 350 switches the second circulation fan 152 into a turn-on state to circulate the cold air generated by the second evaporator 242. In this instance, the circulation of the cold air occurs in the freezer compartment 70 by the second circulation fan 152 as shown in FIG. 13.

Upon the refrigerating operation $T_1$, the first circulation fan 130 may be turned off, but, the first circulation fan 130 may be continuously driven as shown in FIG. 16. The first circulation fan 130 is driven in this manner, so that it is possible to recover the refrigerant remaining in the first evaporator 241 and prevent the occurrence of frost in the first evaporator 241.

Next, the control unit 350 may perform the freezing operation $T_3$ during the preset time, and then perform the alternate temperature operation $T_2$. When the freezing operation $T_3$ is switched into the alternate temperature operation $T_2$, the flow path switching valve 250 is opened towards the first evaporator 241, and the driving of the first circulation fan 130 is switched into a turn-off state. Due to the deflection of the cold air caused by the convection phenomenon as shown in FIG. 11, the cold air of the cold air flow path 110 is introduced into the alternate temperature section 50b so the alternate temperature section 50b is cooled.

In this instance, the control unit 350 may switch the second circulation fan 152 into the turn-off state, but the present disclosure is not limited thereto. For example, the second circulation fan 152 may be continuously driven even during the alternate temperature operation $T_2$, or continuously driven during the preset time after the alternate temperature operation $T_2$ is started. When the second circulation fan 152 is driven even upon the alternate temperature operation $T_2$ in this manner, the occurrence of frost in the second evaporator 242 may be prevented, and the refrigerant remaining in the second evaporator 242 may be recovered to the compressor 210 again, so that the refrigerator 10 may be more efficiently cooled.

When the alternate temperature section 50b reaches the set target temperature through the alternate temperature operation $T_2$, the control unit 350 may start the freezing operation $T_3$ again. When the freezing operation $T_3$ is started again, the flow path switching valve 250 is opened towards the second evaporator 242 again, and the second circulation fan 152 is switched into the turn-on state again. By the operation of the second circulation fan 152, the circulation of the cold air occurs upon the freezing operation T3 as shown in FIG. 13.

When the freezer compartment 70 reaches the set target temperature through the freezing operation $T_3$, the control unit 350 terminates the freezing operation $T_3$. Specifically, the operation of the compressor 210 is stopped, and the flow path switching valve 250 is closed. In this instance, the second circulation fan 152 may be further driven during the preset time $T_5$ after the termination of the freezing operation $T_3$.

As described above, a case in which the refrigerating operation $T_1$ and the freezing operation $T_3$ are respectively performed has been described, but a cooling operation method is not limited thereto. For example, the refrigerator 10 may open all the flow path switching valves 250 to simultaneously perform the refrigerating operation $T_1$ and the freezing operation $T_3$.

The cooling operation of the refrigerator in accordance with one embodiment of the present disclosure may be modified into various methods for efficiently maintaining the temperature of each of the refrigerating compartment 50 and the freezer compartment 70. Hereinafter, still another example of the cooling operation will be described in detail with reference to FIG. 17.

Figure 17:
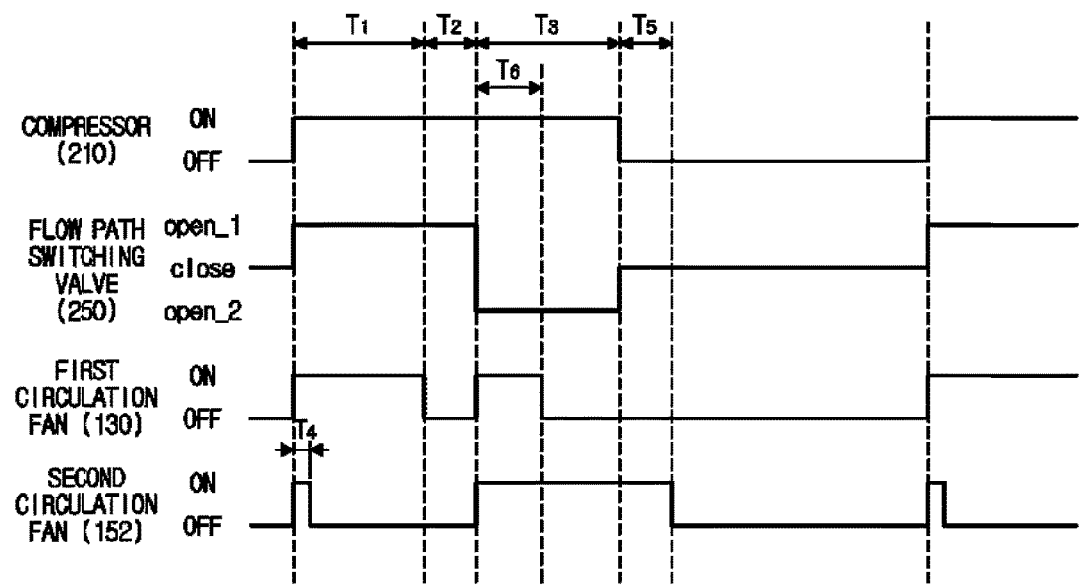
FIG. 17 illustrates still another example of a cooling operation of a refrigerator in accordance with one embodiment of the present disclosure.

Referring to FIGS. 3, 7, and 17, the refrigerator 10 may sequentially perform the refrigerating operation $T_1$, the alternate temperature operation $T_2$, and the freezing operation $T_3$ to cool the refrigerating compartment 50 and the freezer compartment 70.

The control unit 350 switches the compressor 210 into an ON state upon the refrigerating operation $T_1$, the alternate temperature operation $T_2$, and the freezing operation $T_3$ for the cooling of the refrigerating compartment 50 and the freezer compartment 70. When the compressor 210 is turned on, the cooling cycle in which the refrigerant is compressed, condensed, expanded, and evaporated is operated so the cold air is generated.

In addition, the control unit 350 may determine the refrigerating compartment 50 and the freezer compartment 70 to which the cold air is to be supplied, by adjusting the flow path switching valve 250 during the operation of the cooling cycle. In addition, the control unit 350 may adjust the circulation of the cold air by controlling the driving of each of the first circulation fan 130 and the second circulation fan 152.

Specifically, when the refrigerating operation $T_1$ is started, the compressor 210 is switched into the ON state so the cooling cycle is started. In this instance, the flow path switching valve 250 is opened (open_1) towards the first evaporator 241. When the condensed refrigerant is supplied to the first evaporator 241, cold air is generated in the cold air flow path 110 while the condensed refrigerant is evaporated.

In this instance, the first circulation fan 130 is switched into the ON state to allow the cold air generated by the first evaporator 241 to flow. Specifically, when the first circulation fan 130 is driven, the cold air of the cold air flow path 110 is circulated while being rotated in the clockwise direction, as shown in FIG. 10. That is, the cold air of the cold air flow path 110 is discharged to the first passage 141 by the first circulation fan 130 to sequentially cool the refrigerating section 50a and the alternate temperature section 50b, and is introduced into the cold air flow path 110 through the second passage 142 again.

In addition, at the beginning of the refrigerating operation $T_1$, the second circulation fan 152 may be driven during the preset time $T_4$, so it is possible to recover the refrigerant remaining in the second evaporator 242 to the compressor 210 again. When the second circulation fan 152 is driven at the beginning of the refrigerating operation $T_1$ in this manner, the refrigerant remaining in the second evaporator 242 is introduced into the compressor 210 again while being evaporated, thereby increasing the cooling efficiency.

When the refrigerating section 50a reaches the set target temperature through the refrigerating operation $T_1$, the control unit 350 may terminate the refrigerating operation $T_1$ and start the alternate temperature operation $T_2$. As described above, when the target temperature of the alternate temperature section 50b is set to be lower than the target temperature of the refrigerating section 50a, the additional cooling may be demanded in the alternate temperature section 50b.

The alternate temperature section 50b may be cooled to the lower temperature through the alternate temperature operation $T_2$. Specifically, the control unit 350 switches the first circulation fan 130 into the turn-off state. When the driving of the first circulation fan 130 is stopped, the cold air of the cold air flow path 110 may cause natural convection.

By such a convection phenomenon, the cold air of the cold air flow path 110 may be deflected downward.

The deflected cold air is introduced into the alternate temperature section 50b through the second passage 142 to cool the alternate temperature section 50b. In this instance, the control unit 350 may compress the refrigerant at the higher pressure by increasing the rotational speed of the compressor 210, so that the deflection of the cold air of the cold air flow path 110 may be maximized.

When the alternate temperature section 50b reaches the set target temperature through the alternate temperature operation $T_2$, the control unit 350 may terminate the alternate temperature operation $T_2$ and start the freezing operation $T_3$. Specifically, the control unit 350 may change the flow of the refrigerant to the direction of the second evaporator 242 by adjusting the flow path switching valve 250, and switch the second circulation fan 152 into the ON state.

That is, when the freezing operation $T_3$ is started, the flow path switching valve 250 is opened (open_2) towards the second evaporator 242. The cold air generated while the refrigerant having been introduced into the second evaporator 242 is evaporated may cool the freezer compartment 70 while being circulated inside the freezer compartment 70 by the second circulation fan 152.

In this instance, the control unit may drive the first circulation fan 130 during a preset time $T_6$ after the refrigerant supply to the first evaporator 241 is stopped. When the first circulation fan 130 is driven during the preset time $T_6$ in this manner, the refrigerant remaining in the first evaporator 241 may be introduced into the compressor 210 again while being evaporated, and therefore it is possible to recover the refrigerant remaining in the first evaporator 241. In addition, it is possible to additionally cool the refrigerating compartment 50 using the refrigerant remaining in the first evaporator 241, and prevent the occurrence of frost in the first evaporator 241.

When the freezer compartment 70 reaches the set target temperature through the freezing operation $T_3$, the control unit 350 terminates the freezing operation $T_3$. Specifically, the driving of the compressor 210 is stopped, and the flow path switching valve 250 is closed.

In this instance, the second circulation fan 152 may be further driven during the preset time $T_5$ after the termination of the freezing operation $T_3$, so it is possible to recover the remaining refrigerant of the second evaporator 242. In addition, it is possible to additionally cool the freezer compartment 70 using the refrigerant remaining in the second evaporator 242, and prevent the occurrence of frost in the second evaporator 242. Meanwhile, the first cold air supply unit 100 may be modified into various types. Hereinafter, another type of the first cold air supply unit 100 will be described in detail with reference to FIG. 18.

Figure 18:
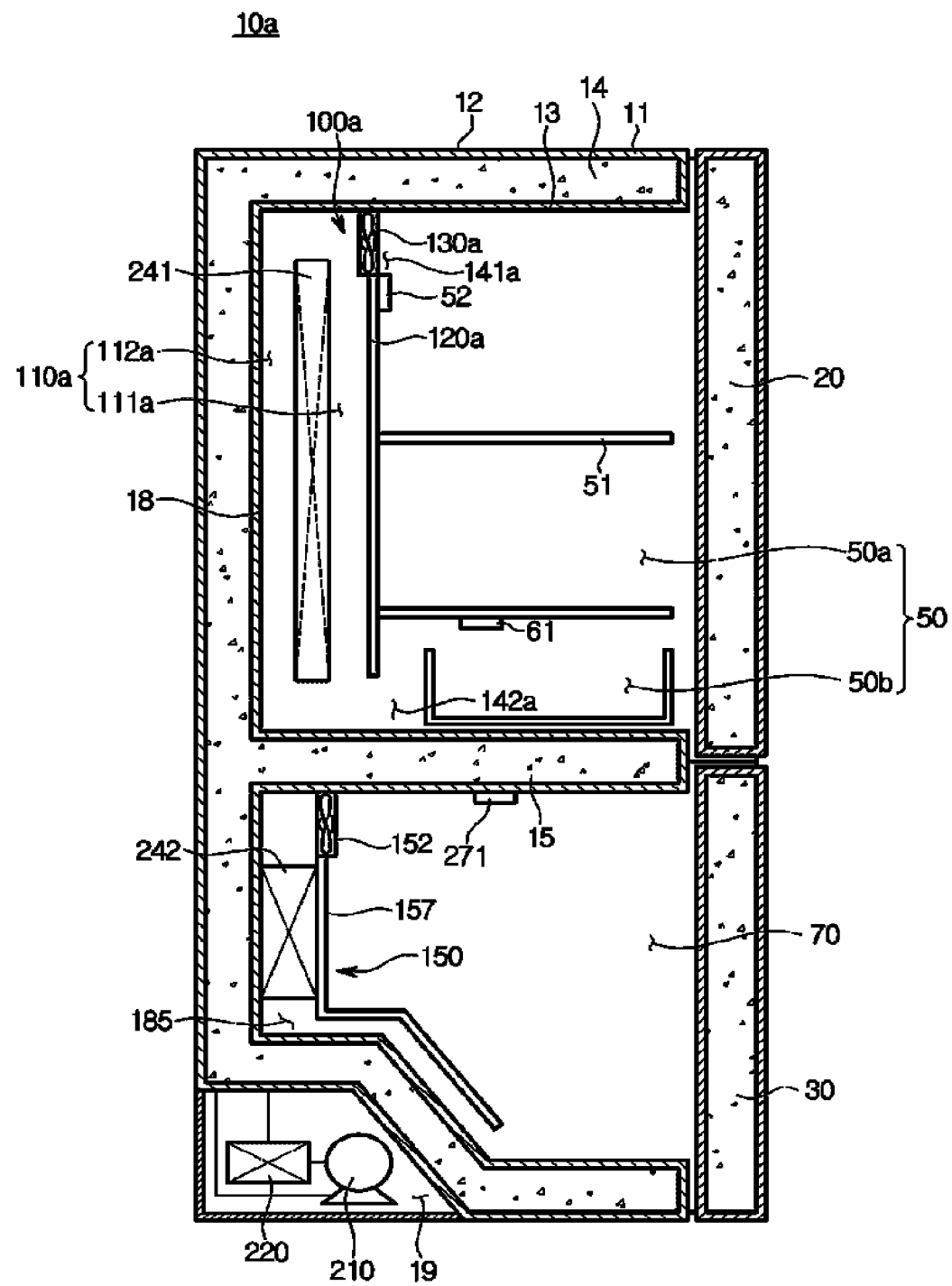
FIG. 18 shows a refrigerator in accordance with another embodiment of the present disclosure.

FIG. 18 shows a refrigerator in accordance with another embodiment of the present disclosure. Referring to FIG. 18, a refrigerator 10a includes a first cold air supply unit 100a in which a cold air flow path 110a is provided.

The first cold air supply unit 100a includes a first cover 120a. The first cover 120a is provided forward from the rear surface 18 of the refrigerating compartment 50 to form the cold air flow path 110a. In this instance, the first cover 120a may be provided without bending as shown in FIG. 18.

In FIG. 6, a case in which the first passage 141 and the second passage 142 are formed in the first cover 120 has been described, but the present disclosure is not limited thereto. Specifically, as shown in FIG. 18, the first cover 120a may be provided downward from the ceiling of the refrigerating compartment 50 to form a first passage 141a.

That is, the first passage 141a is formed between the ceiling of the refrigerating compartment 50 and the upper surface of the first cover 120a.

In addition, the first cover 120a may be provided upward from the bottom of the refrigerating section 50a to form a second passage 142a. That is, the second passage 142a is formed between the bottom of the refrigerating section 50a and the lower surface of the first cover 120a.

In addition, a first circulation fan 130a may be provided in the position corresponding to the first passage 141a. When the first circulation fan 130a is provided in the position corresponding to the first passage 141a, the first circulation fan 130a may be rotated in the opposite direction to that in the first circulation fan 130 shown in FIG. 3 to allow the cold air to flow. That is, the first circulation fan 130a may draw the cold air of the cold air flow path 110a and discharge the drawn cold air to the refrigerating section 50a to allow the cold air to flow.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:
    a refrigerating compartment including a refrigerating section formed on an upper side thereof and an alternate temperature section formed on a lower side thereof;
    a cold air flow path formed on a rear side of the refrigerating compartment;
    a compressor that compresses a refrigerant to yield a compressed refrigerant, the compressor compressing at a normal speed during a normal operation of supplying cold air to the refrigerating compartment;
    a condenser that condenses the compressed refrigerant to yield a condensed refrigerant;
    an evaporator that is provided in the cold air flow path and evaporates the condensed refrigerant to generate the cold air;
    a cover disposed between the cold air flow path and the refrigerating compartment and forming at least one flow passage that guides the cold air generated by the evaporator to flow around the refrigerating compartment section and the alternate temperature section;
    a refrigerating compartment circulation fan disposed in at least a portion of the at least one flow passage for allowing the generated cold air to flow between the cold air flow path and the alternate temperature section; and
    a processor to control the refrigerating compartment circulation fan to circulate the cold air generated by the evaporator,
    wherein the processor controls the refrigerating compartment circulation fan to turn on to cool the refrigerating compartment in the normal operation, and to turn off the refrigerating compartment circulation in response to the processor determining that a difference between an actual temperature of the refrigerating section and a target temperature of the alternate temperature section reaches a threshold temperature so that the cold air of the cold air flow path is introduced into the alternate temperature section by natural convection to cool the alternate temperature section, and
    wherein the processor further controls the compressor to compress the refrigerant at higher pressure than at the normal operation by increasing a rotational speed of the compressor in response to the processor determining that the refrigerating compartment circulation fan is turned off to cause the evaporator to be further activated to generate the cold air in order to maximize the introduction of the cold air of the cold air flow path to the alternate temperature section by the natural convection.

2. The refrigerator according to claim 1, wherein, when the refrigerating compartment circulation fan is turned on, the cold air of the cold air flow path is discharged to the refrigerating section to sequentially cool the refrigerating section and the alternate temperature section, and then is introduced into the cold air flow path again.

3. The refrigerator according to claim 1, wherein at least one flow passage that includes
   a first passage that is provided between the cold air flow path and the refrigerating section, and
   a second passage that is provided between the cold air flow path and the alternate temperature section.

4. The refrigerator according to claim 1, wherein the cold air flow path is divided into a front flow path and a rear flow path by the evaporator.

5. A refrigerator comprising:
   a freezer compartment;
   a refrigerating compartment including a refrigerating section formed on an upper side thereof and an alternate temperature section formed on a lower side thereof;
   a cold air flow path formed on a rear side of the refrigerating compartment;
   a compressor that compresses a refrigerant to yield a compressed refrigerant, the compressor compressing at a normal rotational speed during a normal operation of supplying cold air to the refrigerating compartment and the freezer compartment;
   a condenser that condenses the compressed refrigerant to yield a condensed refrigerant; and
   a first evaporator that is provided in the cold air flow path, and evaporates the condensed refrigerant to generate cold air in the cold air flow path;
   a second evaporator that is provided in the freezer compartment to generate cold air;
   a cover disposed between the cold air flow path and the refrigerating compartment and forming at least one flow passage that guides the cold air generated by the first evaporator to flow around the refrigerating compartment section and the alternate temperature section;
   a refrigerating compartment circulation fan disposed in at least a portion of the at least one flow passage for allowing the generated cold air to flow between the cold air flow path and the alternate temperature section;
   a processor to control the refrigerating compartment circulation fan to circulate the cold air generated by the first evaporator;
   a freezer compartment circulation fan that allows cold air of the freezer compartment to flow;
   wherein the processor controls the refrigerating compartment circulation fan to turn on to cool the refrigerating compartment in the normal operation, and to turn off the refrigerating compartment circulation fan in response to the processor determining that a difference between an actual temperature of the refrigerating section and the target temperature of the alternate temperature section reaches a threshold temperature so that the cold air of the cold air flow path is introduced into the alternate temperature section by natural convection to cool the alternate temperature section, and
   wherein the processor further controls the compressor to compress the refrigerant at higher pressure than at the normal operation by increasing a rotational speed of the compressor in response to the processor determining that the refrigerating compartment circulation fan is turned off to cause the first evaporator to be further activated to generate the cold air in order to maximize the introduction of the cold air of the cold air flow path to the alternate temperature section by the natural convection.

6. The refrigerator according to claim 5, wherein a flow path switching valve that is provided between the first evaporator and the second evaporator to selectively adjust an introduction of the condensed refrigerant to the first evaporator and the second evaporator.

7. The refrigerator according to claim 6, wherein the processor adjusts the flow path switching valve so that the condensed refrigerant is introduced into the first evaporator, and drives the refrigerating compartment circulation fan to cool the refrigerating section.

8. The refrigerator according to claim 7, wherein, the processor causes deflection of the cold air of the cold air flow path to cool the alternate temperature section by turning off the refrigerating compartment circulation fan, when the refrigerating section reaches a target temperature.

9. The refrigerator according to claim 8, wherein the processor controls the flow path switching valve so that the condensed refrigerant is introduced into the second evaporator, when the alternate temperature section reaches a target temperature.

10. The refrigerator according to claim 9, wherein the processor cools the freezer compartment by turning on the freezer compartment circulation fan when the condensed refrigerant is introduced into the second evaporator, and closes the flow path switching valve, turns off the compressor and turns off the refrigerating compartment circulation fan, when the freezer compartment reaches a target temperature.

11. The refrigerator according to claim 6, wherein the processor recovers the refrigerant remaining in the second evaporator by turning on the freezer compartment circulation fan when driving of the compressor begins.

12. The refrigerator according to claim 6, wherein the refrigerating compartment circulation fan is driven during a preset time after the introduction of refrigerant to the first evaporator is stopped, and thereby prevents occurrence of frost in the first evaporator.

13. The refrigerator according to claim 6, wherein the freezer compartment circulation fan is driven during a preset time after the introduction of refrigerant to the second evaporator is stopped, and thereby prevents occurrence of frost in the second evaporator.

14. The refrigerator according to claim 6,
   wherein the cover includes a first passage that connects the cold air flow path and the refrigerating section and a second passage that connects the cold air flow path and the alternate temperature section.

15. The refrigerator according to claim 6, wherein the cold air flow path is divided into a front flow path and a rear flow path by the first evaporator.

* * * * *